(12) United States Patent
Hirai et al.

(10) Patent No.: US 6,707,997 B2
(45) Date of Patent: Mar. 16, 2004

(54) FLASH CONTROL SYSTEM

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/265,679

(22) Filed: Oct. 8, 2002

(65) Prior Publication Data

US 2003/0068165 A1 Apr. 10, 2003

(30) Foreign Application Priority Data

Oct. 9, 2001 (JP) ........................................ 2001-311005

(51) Int. Cl.[7] ............................................... G03B 15/03
(52) U.S. Cl. ........................................ 396/157; 396/159
(58) Field of Search ................................ 396/121, 157, 396/159, 225, 234

(56) References Cited

U.S. PATENT DOCUMENTS

| | | |
|---|---|---|
| 3,757,654 A | 9/1973 | Mori |
| 5,268,730 A | 12/1993 | Takagi |
| 5,504,553 A | 4/1996 | Takagi |
| 5,596,387 A | 1/1997 | Takagi |
| 5,617,175 A | 4/1997 | Asakura et al. |
| 5,710,948 A | 1/1998 | Takagi |
| 5,749,002 A | 5/1998 | Iwasaki |
| 5,987,265 A | 11/1999 | Iwasaki |
| 6,067,422 A | 5/2000 | Tokunaga et al. |
| 6,175,693 B1 | 1/2001 | Iida |
| 6,222,622 B1 | 4/2001 | Hirai et al. |
| 6,487,372 B2 | 11/2002 | Hirai et al. |
| 6,510,285 B2 * | 1/2003 | Hirai et al. ............ 396/159 |

FOREIGN PATENT DOCUMENTS

| | | |
|---|---|---|
| JP | 5-340804 | 12/1993 |
| JP | 6-160936 | 6/1994 |
| JP | 7-84299 | 3/1995 |
| JP | 10253449 | 9/1998 |
| JP | 2000-310812 | 11/2000 |

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

There is provided a flash control system for a camera, which is provided with an automatic flash device which uses a predetermined appropriate amount of light to control emission of flash light, a control system that preliminarily emits the flash light, a first photometric sensors for colorimetry, a color determining system that determines the color of the object. Further, the flash control system is provided with a first colorimetric compensation value determining system which determines a first colormetric compensation value based on the determined color, and a flash control level adjusting system that adjusts the predetermined appropriate amount of light based on the first colorimetric compensation value.

13 Claims, 35 Drawing Sheets

FIG. 9

| GAIN=1 (SW2:ON) | | | | GAIN=4 (SW2:OFF) | | | |
|---|---|---|---|---|---|---|---|
| SXVD | LEVEL(mV) | D/A STEP | IOS | SXVD | LEVEL(mV) | D/A STEP | IOS |
| 10 0/8 | 2000 | 200H | 25 | 13 0/8 | 1000 | 100H | 200 |
| 10 1/8 | 1834 | 1D5H | | 13 1/8 | 917 | EBH | |
| 10 2/8 | 1682 | 1ABH | | 13 2/8 | 814 | D7H | |
| 10 3/8 | 1542 | 18AH | | 13 3/8 | 771 | C5H | |
| 10 4/8 | 1414 | 16AH | | 13 4/8 | 707 | B5H | |
| 10 5/8 | 1297 | 14CH | | 13 5/8 | 648 | A6H | |
| 10 6/8 | 1189 | 130H | | 13 6/8 | 595 | 98H | |
| 10 7/8 | 1090 | 117H | | 13 7/8 | 545 | 88H | |
| 11 0/8 | 1000 | 100H | 50 | 14 0/8 | 500 | 80H | 400 |
| 11 1/8 | 917 | EBH | | 14 1/8 | 459 | 75H | |
| 11 2/8 | 841 | D7H | | 14 2/8 | 420 | 6BH | |
| 11 3/8 | 771 | C5H | | 14 3/8 | 386 | 63H | |
| 11 4/8 | 707 | B5H | | 14 4/8 | 354 | 5BH | |
| 11 5/8 | 648 | A6H | | 14 5/8 | 324 | 53H | |
| 11 6/8 | 595 | 98H | | 14 6/8 | 297 | 4CH | |
| 11 7/8 | 545 | 88H | | 14 7/8 | 273 | 46H | |
| 12 0/8 | 500 | 80H | 100 | 15 0/8 | 250 | 40H | 800 |
| 12 1/8 | 459 | 75H | | 15 1/8 | 229 | 3BH | |
| 12 2/8 | 420 | 6BH | | 15 2/8 | 210 | 36H | |
| 12 3/8 | 386 | 63H | | 15 3/8 | 193 | 31H | |
| 12 4/8 | 354 | 5BH | | 15 4/8 | 177 | 2DH | |
| 12 5/8 | 324 | 53H | | 15 5/8 | 162 | 29H | |
| 12 6/8 | 297 | 4CH | | 15 6/8 | 149 | 26H | |
| 12 7/8 | 273 | 46H | | 15 7/8 | 136 | 23H | |
| | | | | 16 0/8 | 125 | 20H | 1600 |

FIG.10

| NAME OF FLOWCHART | F | PHOTOMETRY SENSOR 12 IS NOT USED | PHOTOMETRY SENSOR 12 IS USED |
|---|---|---|---|
| MAIN PROCEDURE | 1 | ◯ | ◯ |
| LENS COMMUNICATION | 2 | ◯ | ◯ |
| Bvd CALCULATION | 3 – A | ◯ | |
| Bvd CALCULATION | 3 – B | | ◯ |
| OPEN APERTURE COMPENSATION | 4 | ◯ | ◯ |
| COLORIMETRY | 5 | ◯ | ◯ |
| LIGHT SOURCE COMPENSATION | 6 – A | ◯ | |
| LIGHT SOURCE COMPENSATION | 6 – B | | ◯ |
| LIGHT SOURCE DIFFERENCE COMPENSATION | 7 | ◯ | ◯ |
| COLORIMETRIC PARAMETER | 8 | ◯ | ◯ |
| COLORIMETRIC CONSTANTS | 9 | ◯ | ◯ |
| COLOR JUDJEMENT | 10 | ◯ | ◯ |
| COLORIMETRIC COMPENSATION VALUE | 11 | ◯ | ◯ |
| COLORIMETRIC COMPENSATION VALUE | 12 | ◯ | ◯ |
| EXPOSURE VALUE CALCULATION | 13 | ◯ | ◯ |
| EXPOSURE VALUE | 14 | ◯ | ◯ |
| DIVIDED PHOTOMETRY Lvd | 15 | ◯ | ◯ |
| Tvd, Avd CALCULATION | 16 | ◯ | ◯ |
| PRELIMINARY FLASH EMISSION | 17 | ◯ | ◯ |
| Bvd CALCULATION | 18 | ◯ | ◯ |
| OPEN APERTURE COMPENSATION | 19 | ◯ | ◯ |
| COLORIMETRY USING FLASH LIGHT | 20 | ◯ | ◯ |
| LIGHT SOURCE COMPENSATION | 21 – A | ◯ | ◯ |
| LIGHT SOURCE COMPENSATION | 21 – B | | ◯ |
| COLORIMETRIC COMPENSATION VALUE | 22 | ◯ | ◯ |
| RCC CALCULATION | 23 | ◯ | ◯ |
| CONTROL LEVEL ADJUSTING | 24 | ◯ | ◯ |

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

FIG.22

|  | COMPENSATION VALUE |
|---|---|
| Y | −8 |
| M | 0 |
| C | 0 |
| B | +6 |
| G | 0 |
| R | +2 |

(EEPROM)

FIG.26

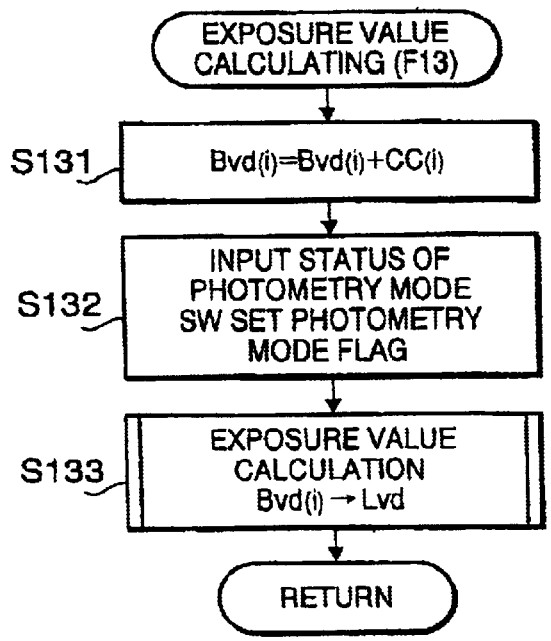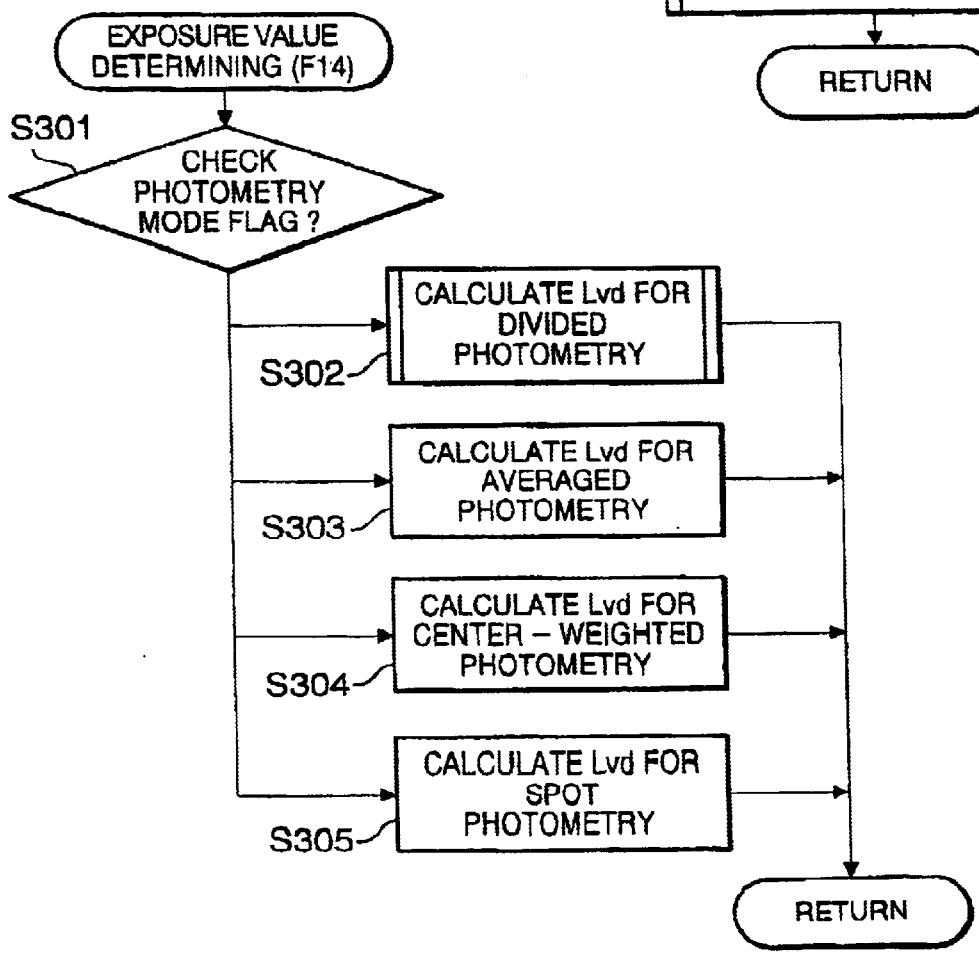

FLASH CONTROL SYSTEM

BACKGROUND OF THE INVENTION

The present invention relates to a flash control system applicable to a camera. More specifically, the present invention relates to a flash control system which is capable of correcting exposure errors due to a difference of reflectivity of objects having different colors when an object is photographed using flash light.

Conventionally, a flash device, which enables to photograph at correct exposure by measuring the brightness of an object detecting flash light reflected from an object, has become widespread. In such a flash device, a time period for which the flash light is emitted is determined based on the measured brightness, and emission of flash light is controlled so that the amount of light exposure becomes a correct value. Further, in such a flash device, the reflectivity of an object is generally assumed to be 18% and the time period for which the flash light is emitted is determined on this assumption.

Therefore, regarding a whitish object whose reflectivity is greater than 18%, the brightness determined based on the flash light reflected from the object is greater than the actual brightness because the determined brightness assumes only 18% reflectivity contributing to the brightness, when the reflectivity contribution is actually higher. If a whitish object is exposed by a camera including such a flash device, the object is under exposed because a time period for which flash light is emitted becomes shorter than a proper time period.

A dark object whose reflectivity is less than 18% is measured to have a lower brightness than the actual brightness because the measured brightness assumes 18% reflectivity contributing to the brightness, when the reflectivity is actually lower. Therefore, such an object is over exposed.

The difference of the reflectivity of objects may also occur depending on the color of objects. For example, when the color of an object is yellow, the reflectivity may be up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 1 Ev greater than necessary.

Therefore, in general, a camera including such a flash device is configured such that exposure parameters (e.g., the time period for which flash light is emitted) is adjusted by a photographer. For example, the photographer guesses the reflectivity of the object and adjusts the exposure parameters so that if the object is a whitish or yellowish one having a high reflectivity, it is to be overexposed, and if the object is a blackish or bluish one having a low reflectivity, it is to be underexposed.

With this operation, the above-described defects may be solved. However, accurately guessing the reflectivity of the object and adjusting the exposure parameters can only be done by experienced and skilled photographers. It is impossible to require all the photographers to do such an operation. Further, it is not preferable that a manual operation of the photographer is required for exposure. Furthermore, if such a manual operation is required, cameras become unsuitable for automatic photographing which is the recent trend.

Recently, a flash control system having a function of measuring the color of the object has been provided. In such a flash control system, the reflectivity of the object is determined based on the measured color, and the time period for which flash light is emitted is controlled based on the determined reflectivity of the object. Since the flash control system obtains accurate information about the reflectivity of the object, the flash control system has an advantage in its suitability for photographing the object at correct exposure using flash light.

However, the flash control system measures the color of the object utilizing natural light, such as sunlight, reflected from the object. Therefore, there may be cases where a color of the object determined by the flash control system utilizing natural light does not match with a color of the object when flash light Is emitted. That is because there is a difference between color rendering properties of natural light and flash light.

The above-described problem occurs when a color of an object is determined using various types of flash light having different color rendering properties.

SUMMARY OF THE INVENTION

The present invention is advantageous in that it provides a flash control system which enables to photograph objects at correct exposure using flash light.

According to an aspect of the invention, there is provided a flash control system for a camera, which is provided with an automatic flash device that controls an amount of emission of flash light based on a result of a comparison between an amount of light sensed by a photometric sensor for normal light and a predetermined appropriate amount of light, a control system that preliminarily emits the flash light, and first photometric sensors for colorimetry capable of performing colorimetry. The first photometric sensors for colorimetry sense different components of light, respectively. The flash control system is further provided with a first color determining system that determines a color of an object based on outputs of the first photometric sensors for colorimetry. The outputs of the first photometric sensors for colorimetry is obtained when the control system preliminarily emits the flash light. Further, the flash control system is provided with a first colorimetric compensation value determining system that determines a first colorimetric compensation value based on the color determined by the first color determining system, and a flash control level adjusting system that adjusts the predetermined appropriate amount of light based on the first colorimetric compensation value. In this case, the automatic flash device uses the predetermined appropriate amount of light adjusted by the flash control level adjusting system to control the amount of emission of flash light.

With this configuration, since the predetermined appropriate amount of light is adjusted based on the color of the object, it becomes possible to photographing the object using the flash light at correct exposure regardless of the color difference of objects (i.e., a difference of reflectivity of objects).

Optionally, each of the first photometric sensors for colorimetry may have a plurality of photometry areas, and may be capable of performing photometry with respect to each of the plurality of photometry areas. In this case, the color determining system may determine the color of the object for each of the plurality of photometry areas. Further, the first colorimetric compensation value determining system may determine the first colorimetric compensation value at each of the plurality of photometry areas, and may determine a second colorimetric compensation value based on the first colorimetric value determined at each of the plurality of photometry areas. The flash control level adjusting system may adjust the predetermined appropriate amount of light according to the second colorimetric compensation value.

In a particular case, the first colorimetric compensation value determining system may determine the second colorimetric compensation value as an average, a center-weighted average, or a maximum value of the first compensation value determined at each of the plurality of photometry areas.

Optionally, the first color determining system may compensate for the outputs of the first photometric sensors for colorimetry depending on data intrinsic to a photographing lens that forms an image of the object, and may determine the color of the object based on the compensated outputs of the first photometric sensors for colorimetry.

Still optionally, the first color determining system may compensate for the outputs of the first photometric sensors for colorimetry according to brightness data with regard to the flash light corresponding to a color rendering property of the flash light, and may determine the color of the object based on the compensated outputs of the first photometric sensors for colorimetry.

In a particular case, the automatic flash device may include an integrating circuit that outputs a quenching signal when the amount of light sensed by the photometric sensor reaches the predetermined appropriate amount of light adjusted by the flash control level adjusting system, and a light emission circuit that stops emission of the flash light when the quenching signal is output by the integrating circuit.

In a particular case, the predetermined appropriate amount of light may be determined based on at least film speed and the first colorimetric compensation value.

Optionally, the flash control system may include a photometry device that determines an exposure value based on normal light reflected from the object, and judges whether emission of the flash light is necessary for photographing the object based on the determined exposure value.

In a particular case, the photometry device may include a normal light sensor capable of performing photometry operation with respect to the object at each of the plurality of photometry areas. The normal light sensor may have a spectral sensitivity characteristic close to those of human eye. The photometry device may further include second photometric sensors for colorimetry capable of performing colorimetry with respect to each of the photometry areas. The second photometric sensors for colorimetry sense different components of light, respectively. Further, the photometry device may include a photometry value determining system that determines an photometry value at each of the plurality of photometry areas in accordance with outputs of the normal light sensor corresponding to the plurality of photometry areas, and a second color determining system that compensates for outputs of the second photometric sensors for colorimetry according to brightness data with regard to the normal light corresponding to a color rendering property of the normal light, and determines a color of the object at each of the plurality of photometry areas based on the compensated outputs of the second photometric sensors for colorimetry. Further, the photometry device may include a second colorimetric compensation value determining system that determines a second colorimetric compensation value at each of the plurality of photometry areas based on the color determined by the second color determining system, and an exposure value determining system that compensates for the photometry value determined by the photometry value determining system for each of the plurality of photometry areas according to the second colorimetric compensation value, and determines the exposure value based on the compensated photometry value. In this case, the predetermined appropriate amount of light is determined based on the exposure value.

In a particular case, the first photometric sensors for colorimetry may be used as the second photometric sensors for colorimetry.

Optionally, the flash control system may include a light source sensor capable of performing colorimetry. The light source sensor may have photometry areas whose spectral sensitivity characteristics are equal to those of the second photometric sensors, respectively. In this case, the second color determining system may compensate for the outputs of the second photometric sensors for colorimetry according to an output of the light source sensor in place of the brightness data with regard to the normal light.

In a particular case, the first photometric sensors for colorimetry may include three sensors which sense a green color component, a red color component, and a blue color component of light, respectively.

According to another aspect of the invention, there is provided a flash control system for a camera having a light sensor that obtains a photometry value, which is provided with photometric sensors for colorimetry, a light source sensor capable of obtaining brightness data corresponding to a color rendering property of normal light. The flash control system further provided with a first compensator that compensates for the photometry value obtained by the light sensor according to a color of an object when photographing is performed using the normal light. The color of the object is determined based on outputs of the photometric sensors for colorimetry and the brightness data. Further, the flash control system is provided with a second compensator that compensates for a predetermined appropriate amount of light according to the color of the object when photographing is performed using flash light. The color of the object is determined based on the outputs of the photometric sensors for colorimetry when the flash light is preliminarily emitted and a predetermined compensation value corresponding to a color rendering property of the flash light.

BRIEF DESCRIPTION OF THE ACCOMPANYING DRAWINGS

FIG. 1 shows a perspective view of a camera to which a flash control system according to the invention is applied;

FIG. 2 schematically shows main components of the camera shown in FIG. 1;

Figure 4A:
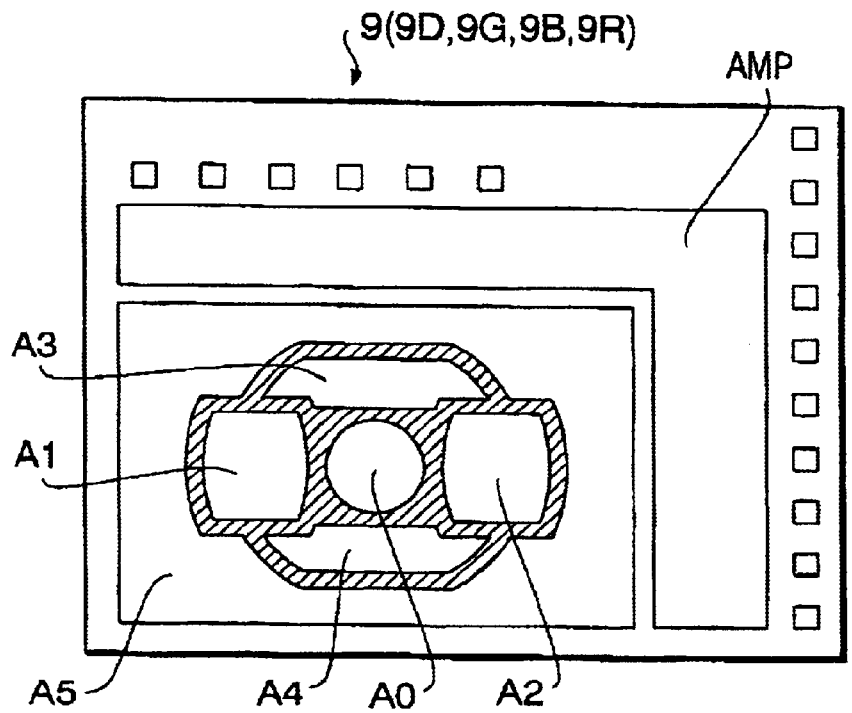
Figure 4B:
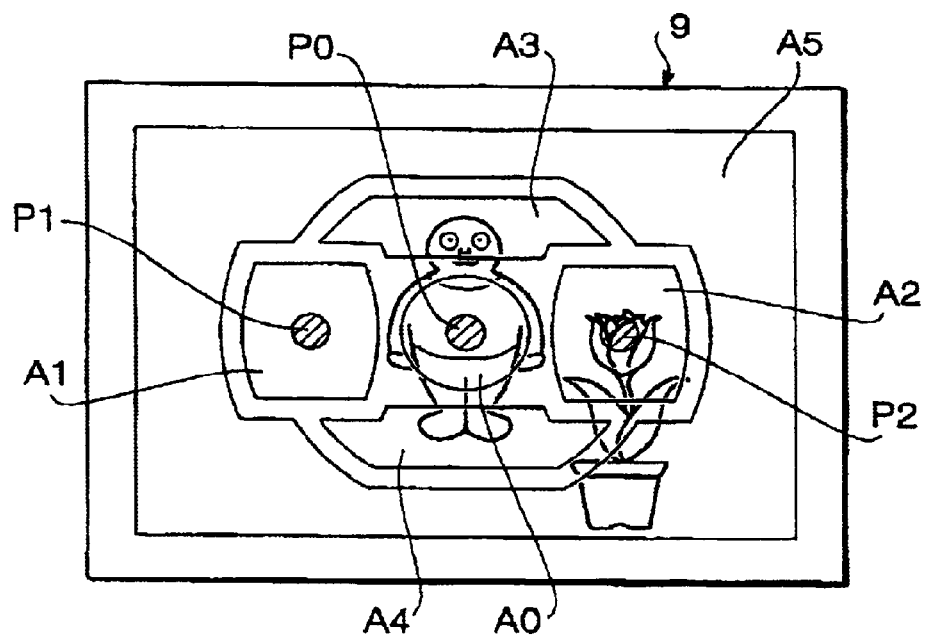
Figure 5:
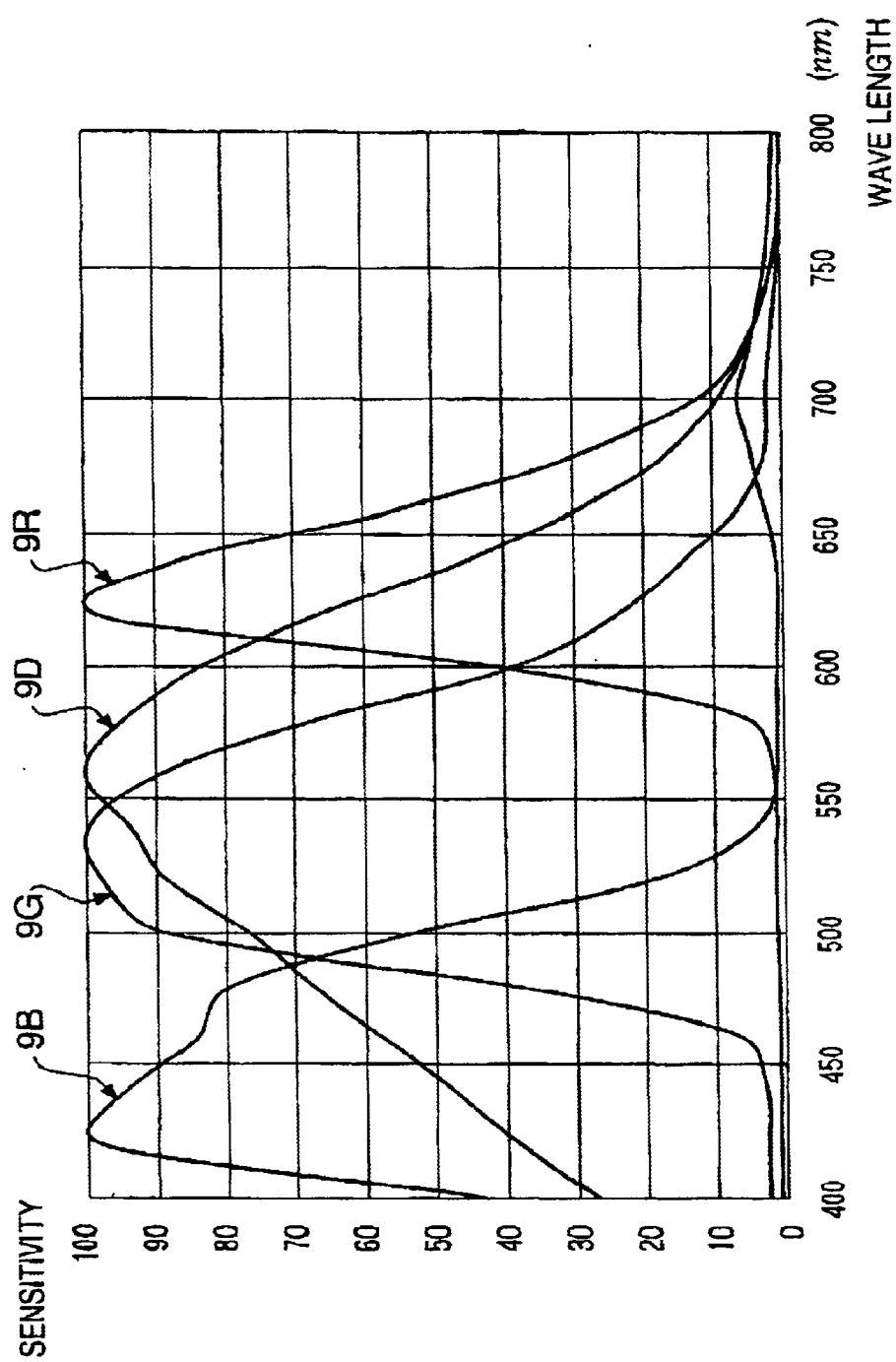
Figure 6:
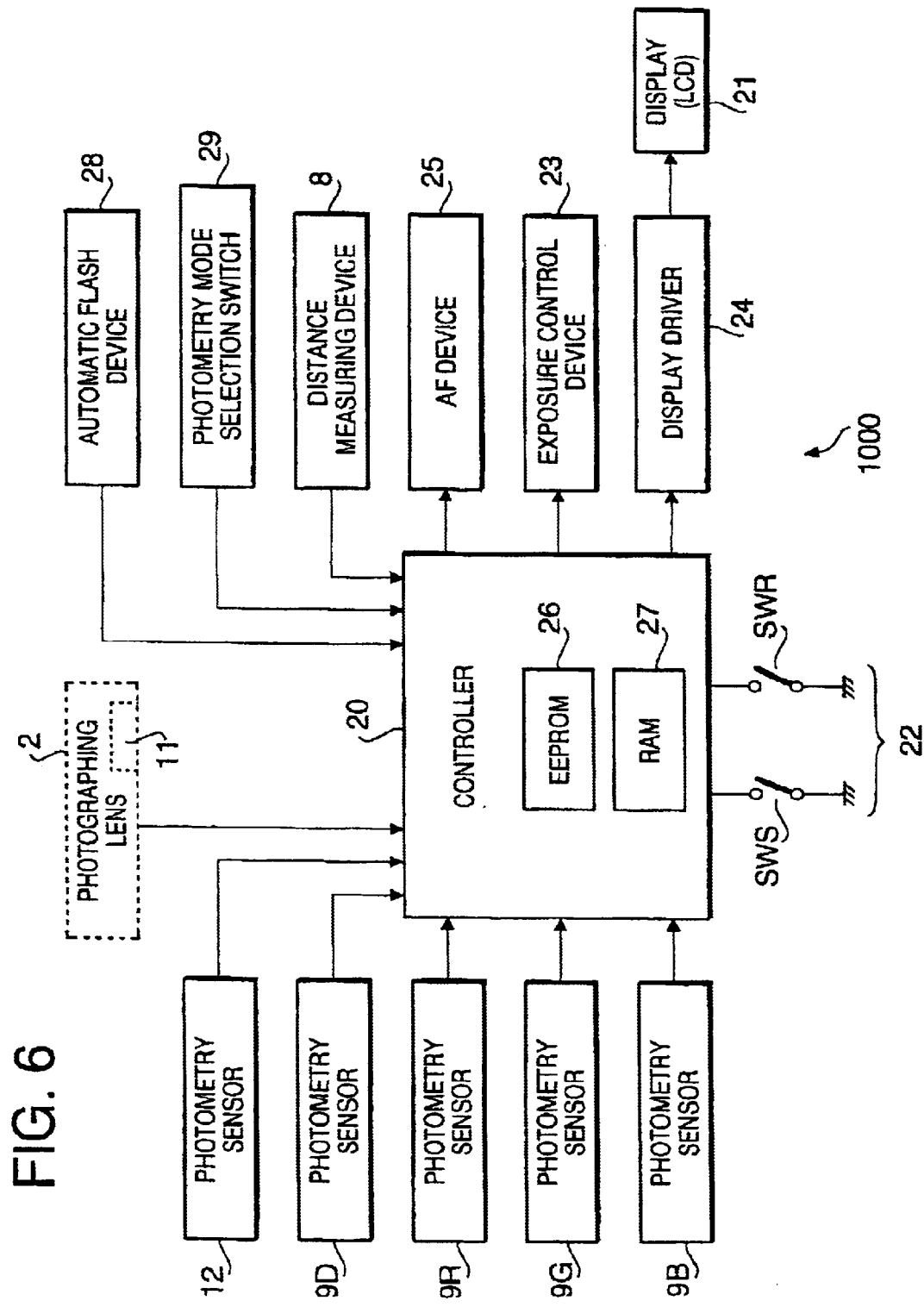
Figure 7:
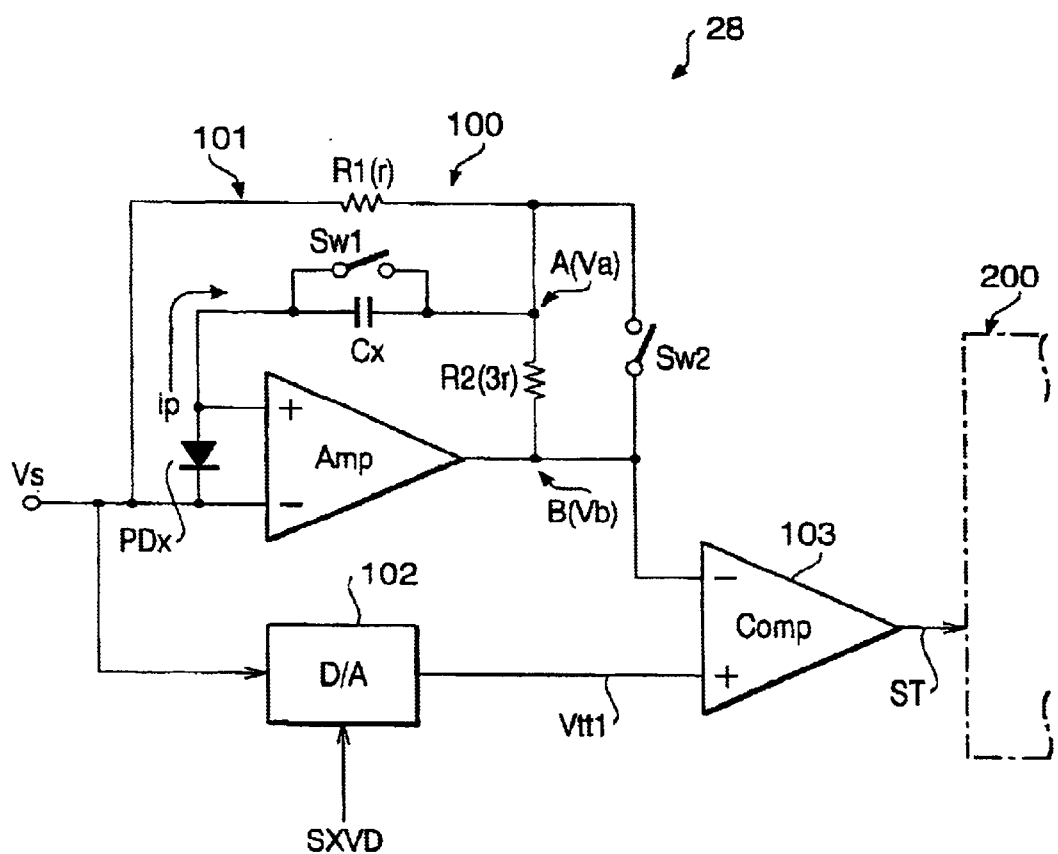
Figure 8:
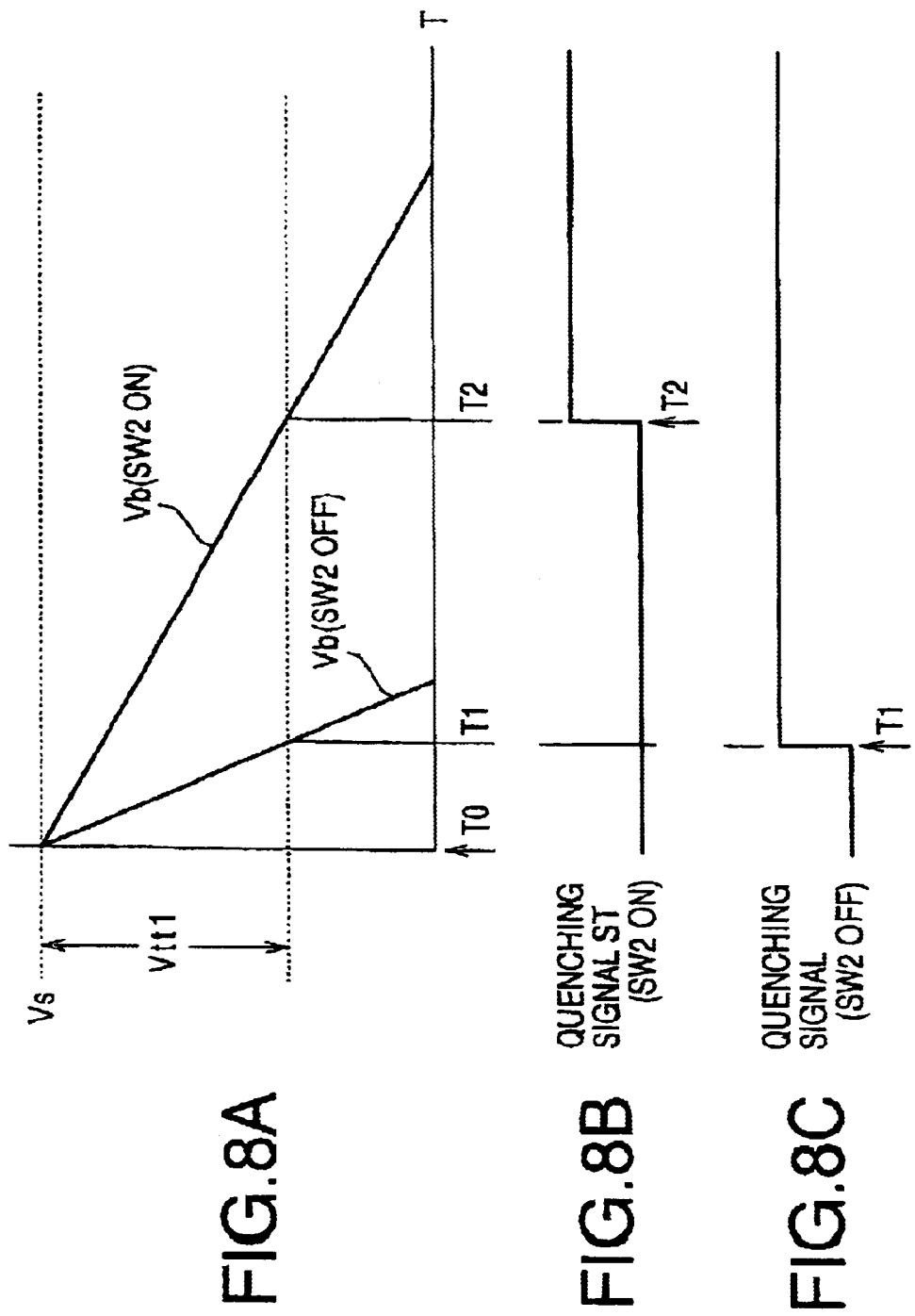
Figure 11A:
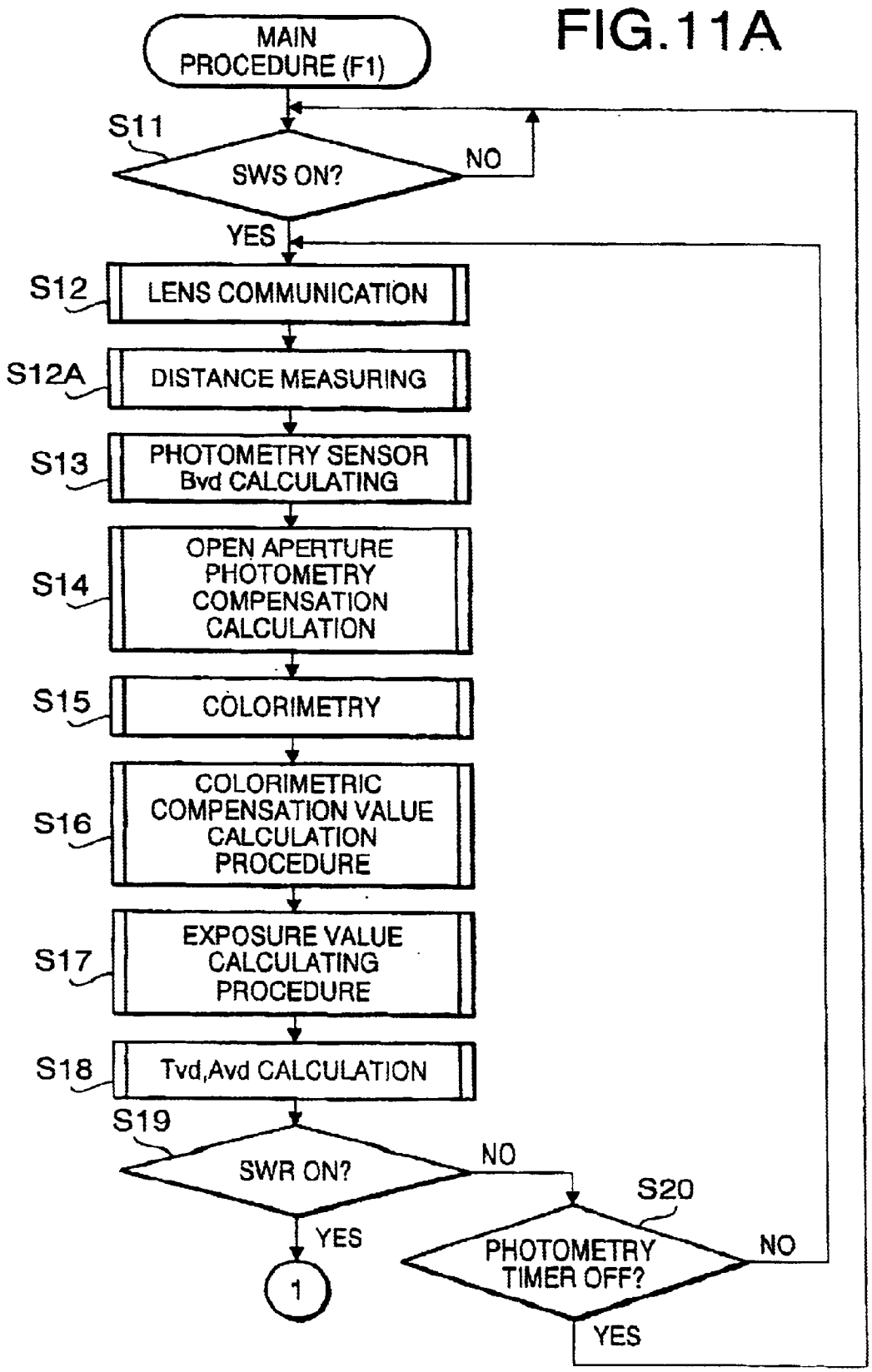
Figure 11B:
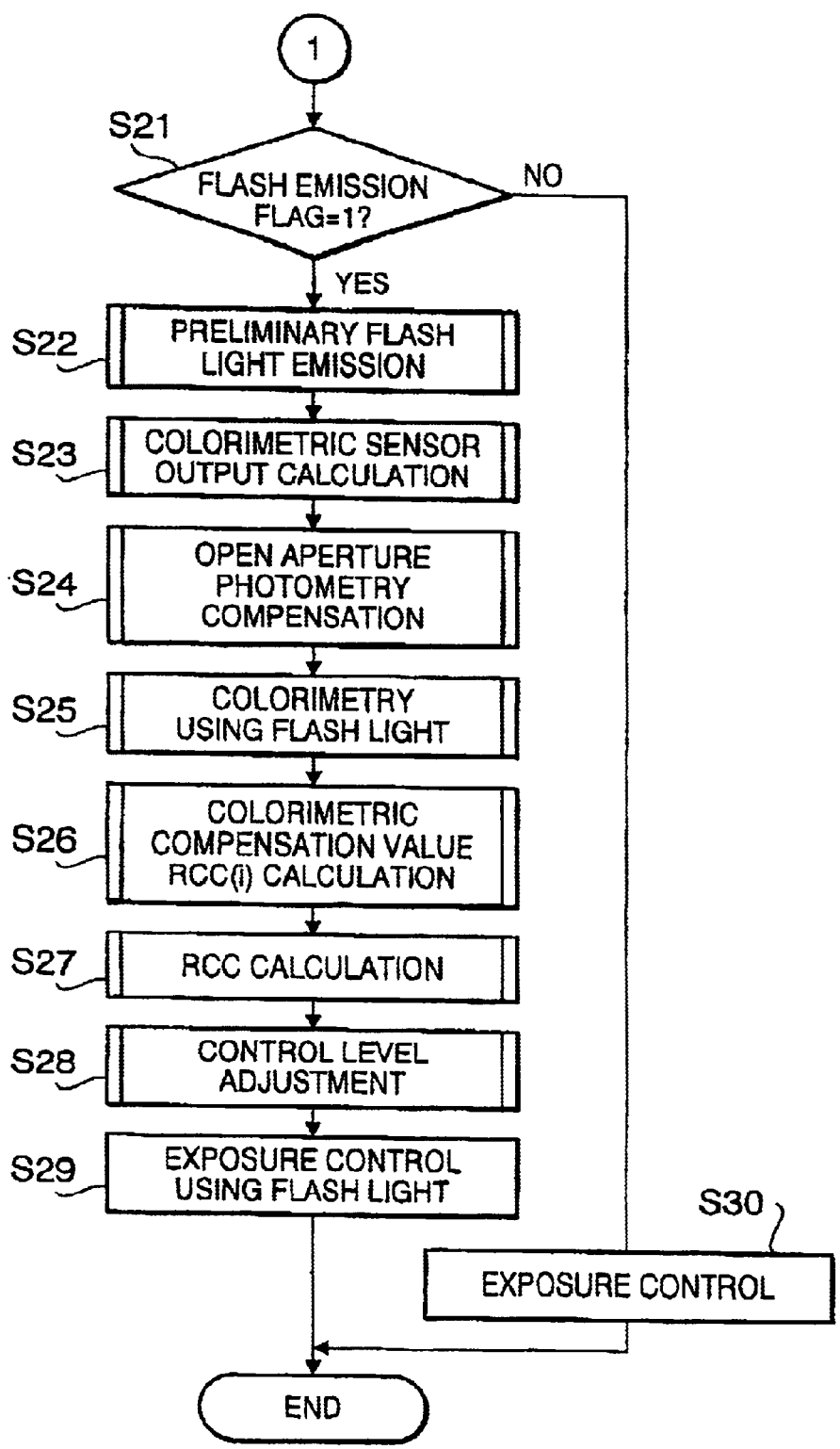
Figure 12:
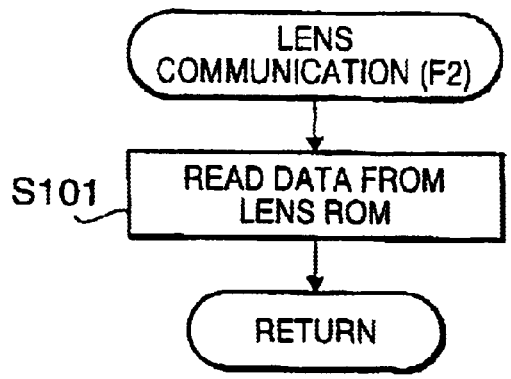
Figure 13:
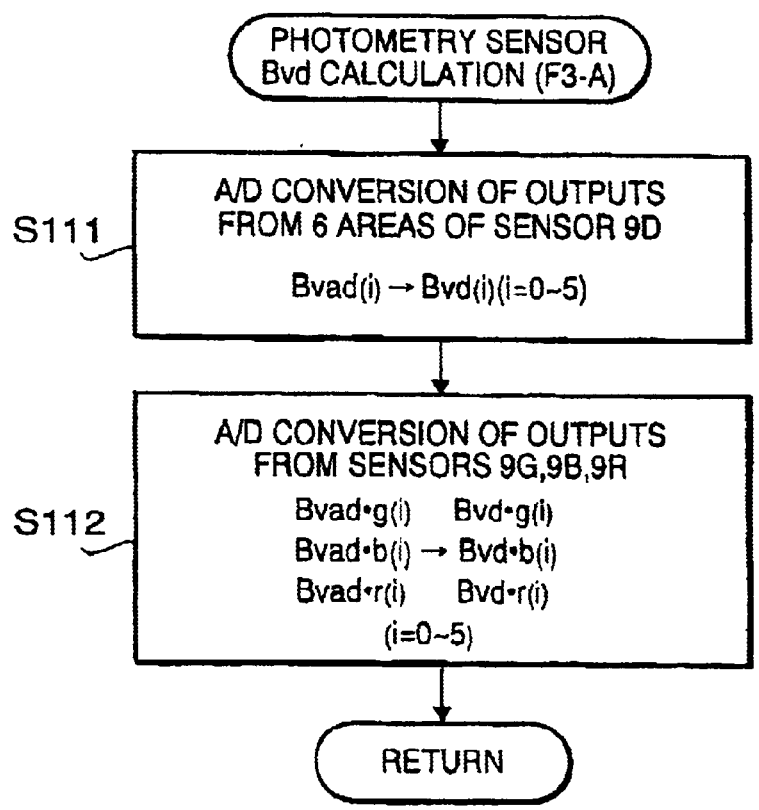
Figure 14:
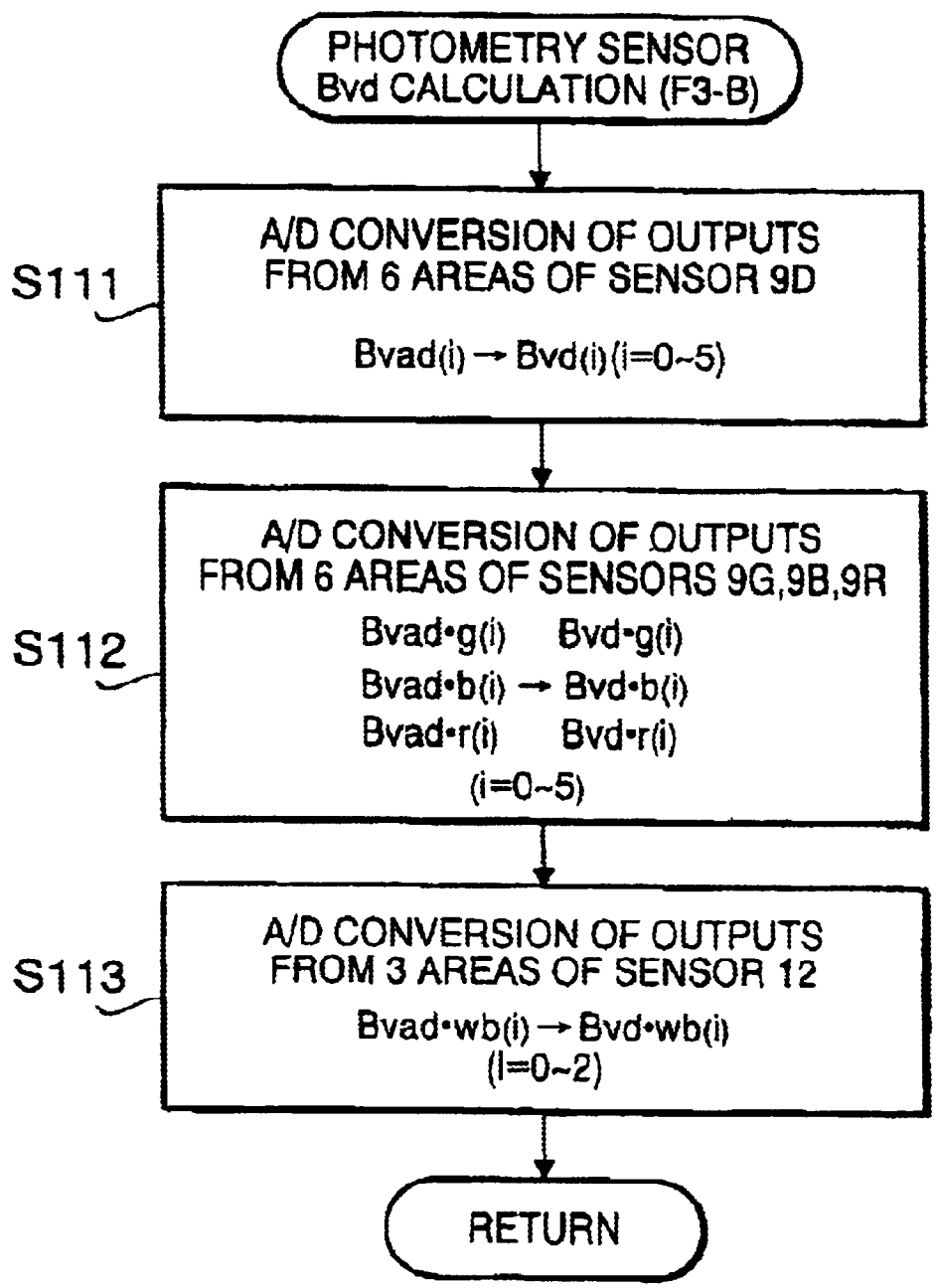
Figure 15:
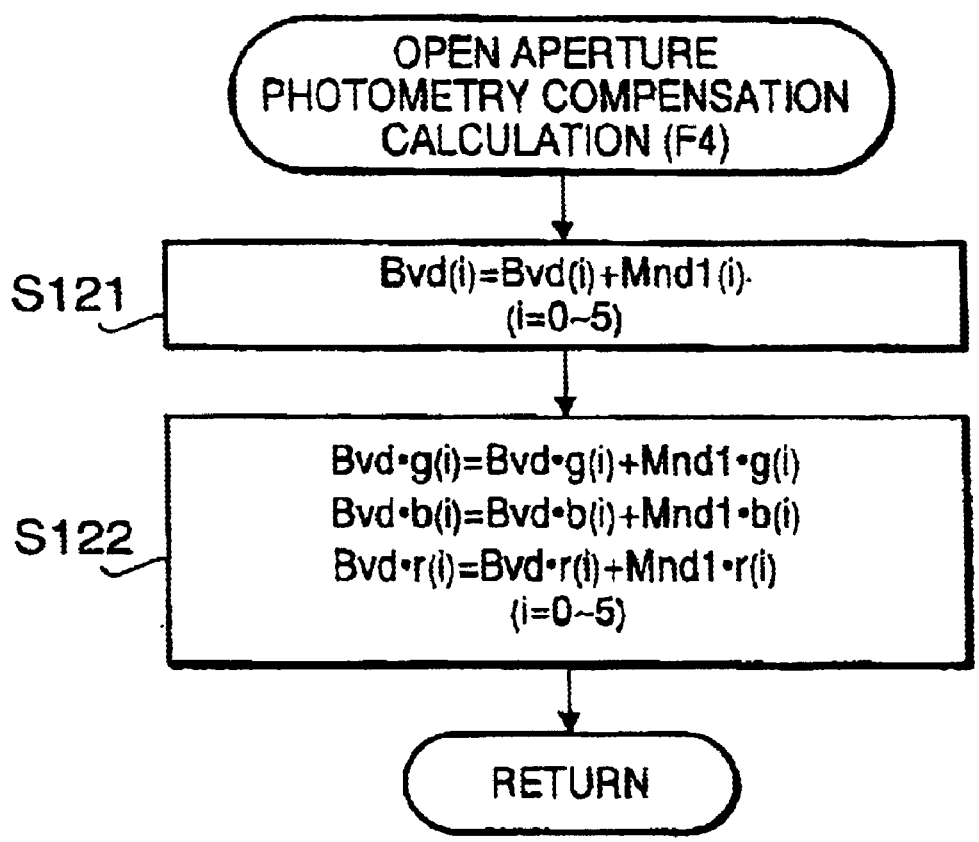
Figure 16:
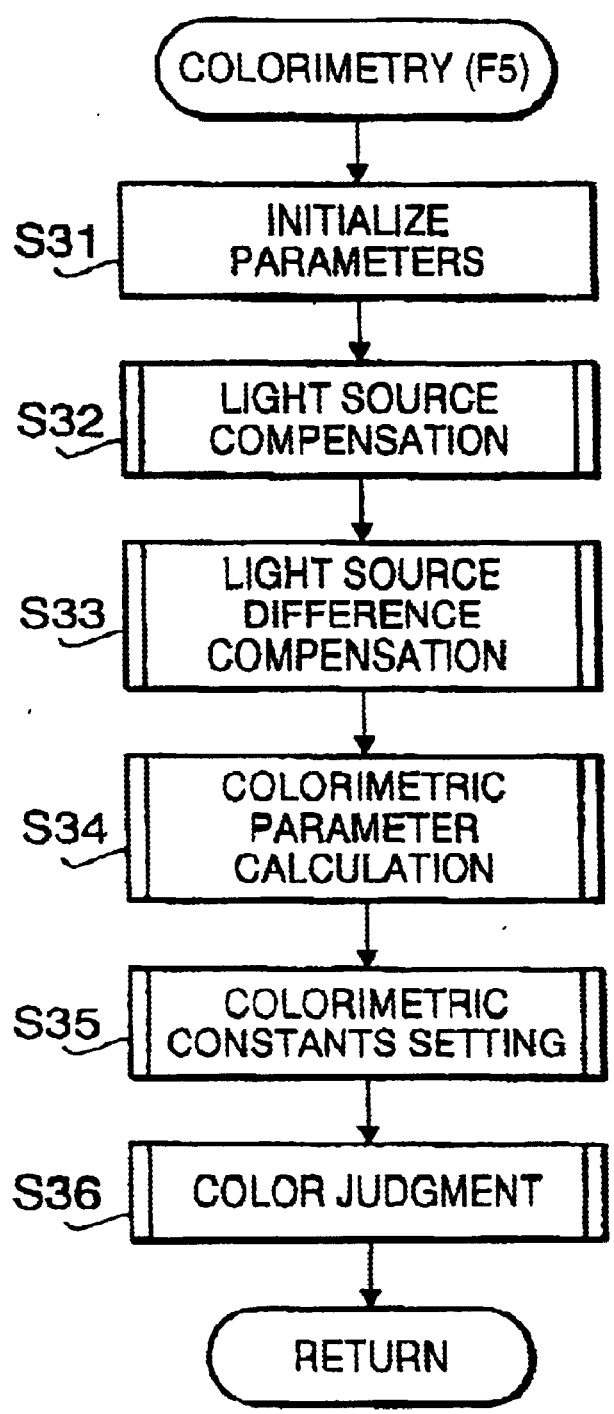
Figure 17:
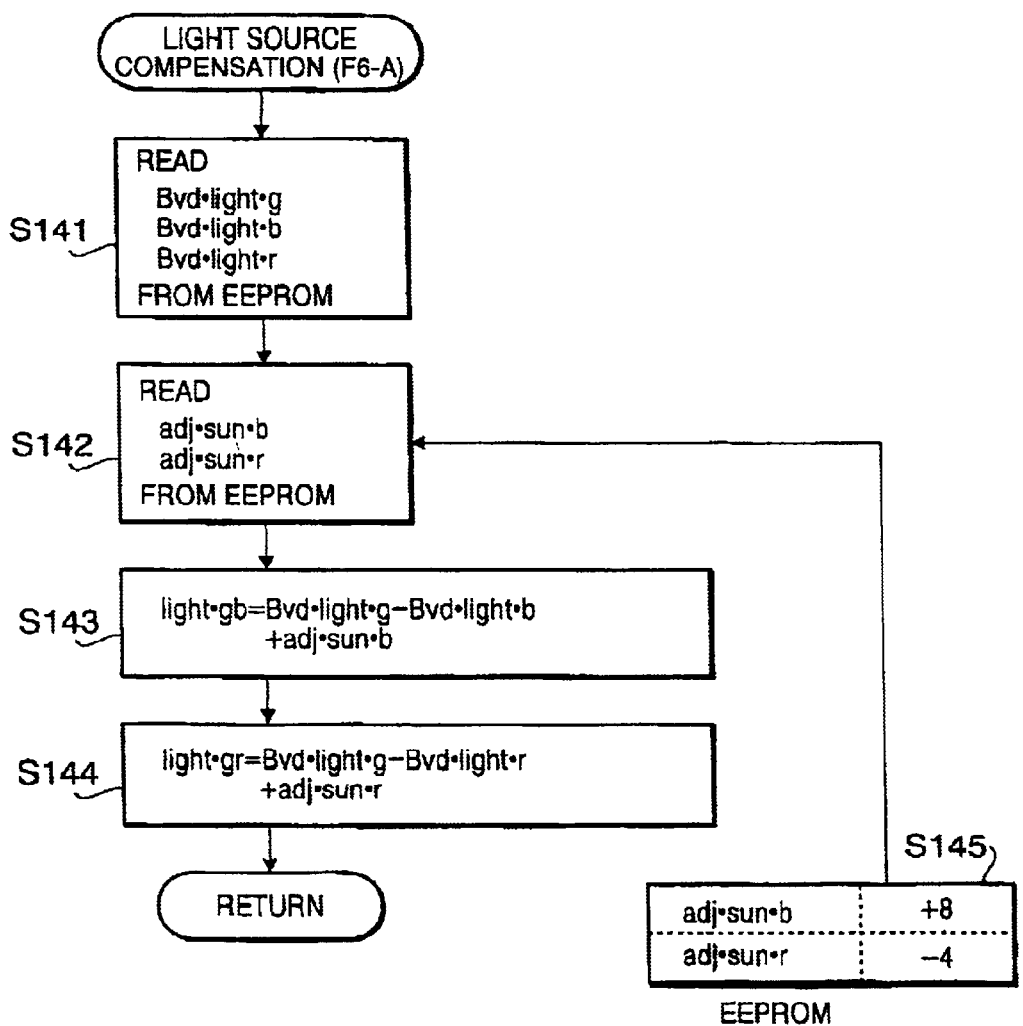
Figure 18:
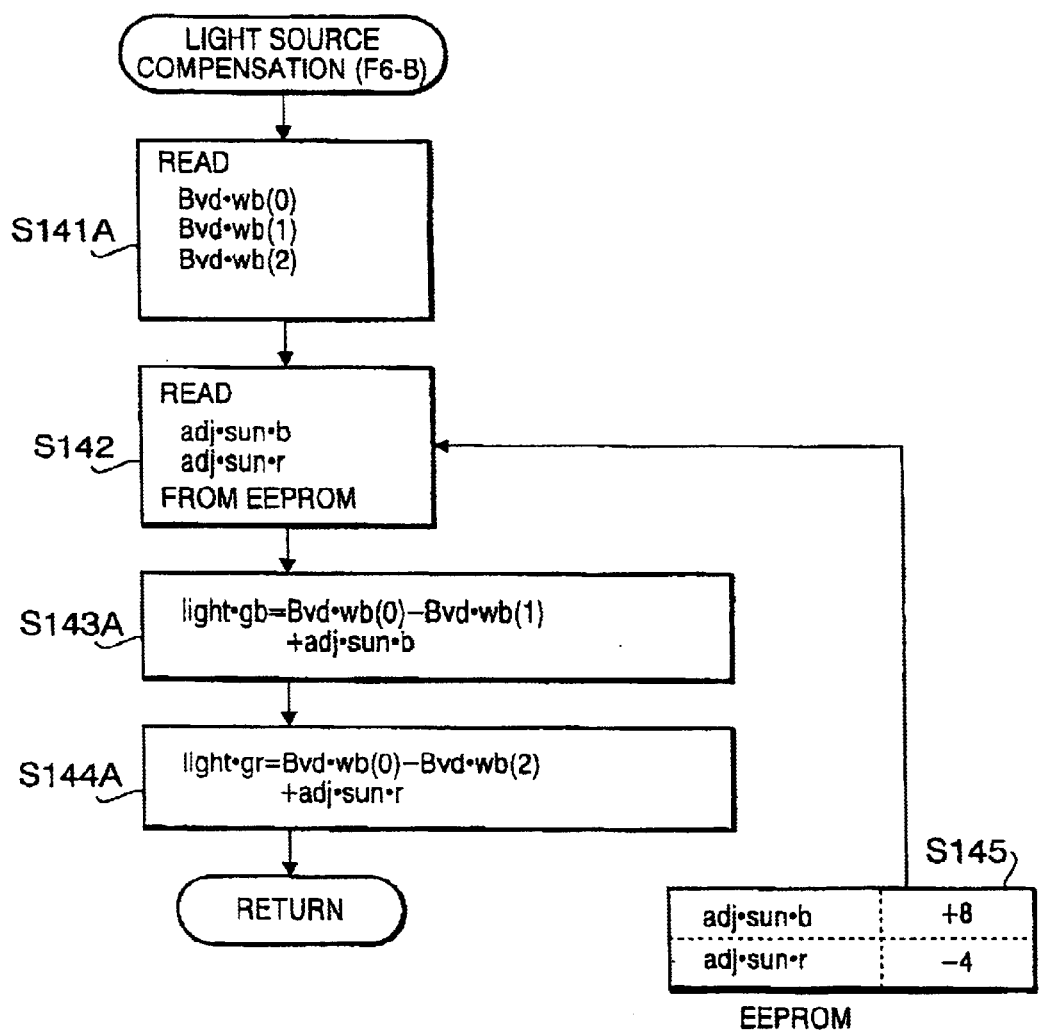
Figure 19:
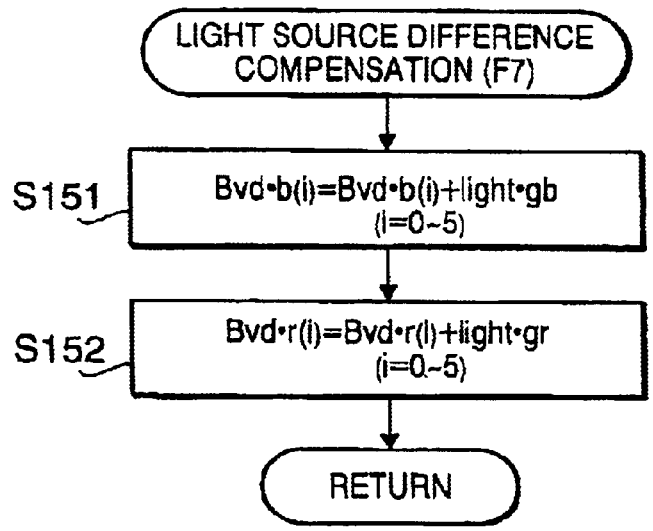
Figure 20:
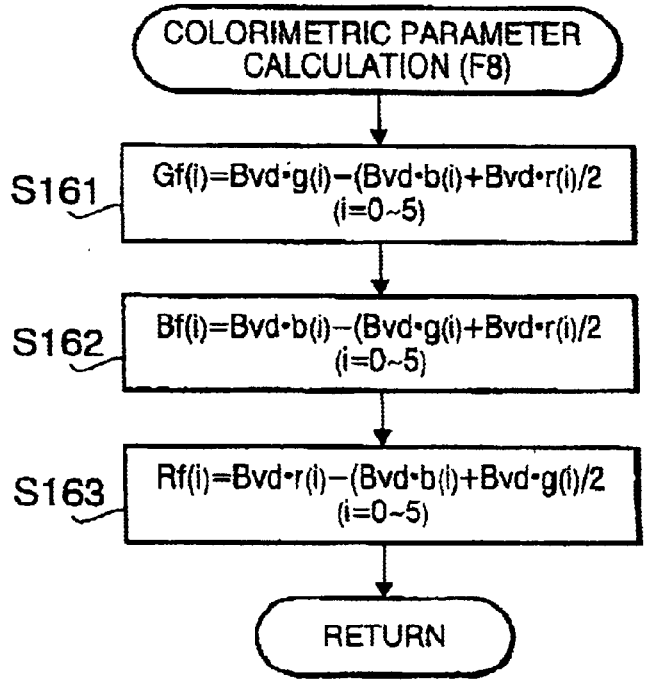
Figure 21:
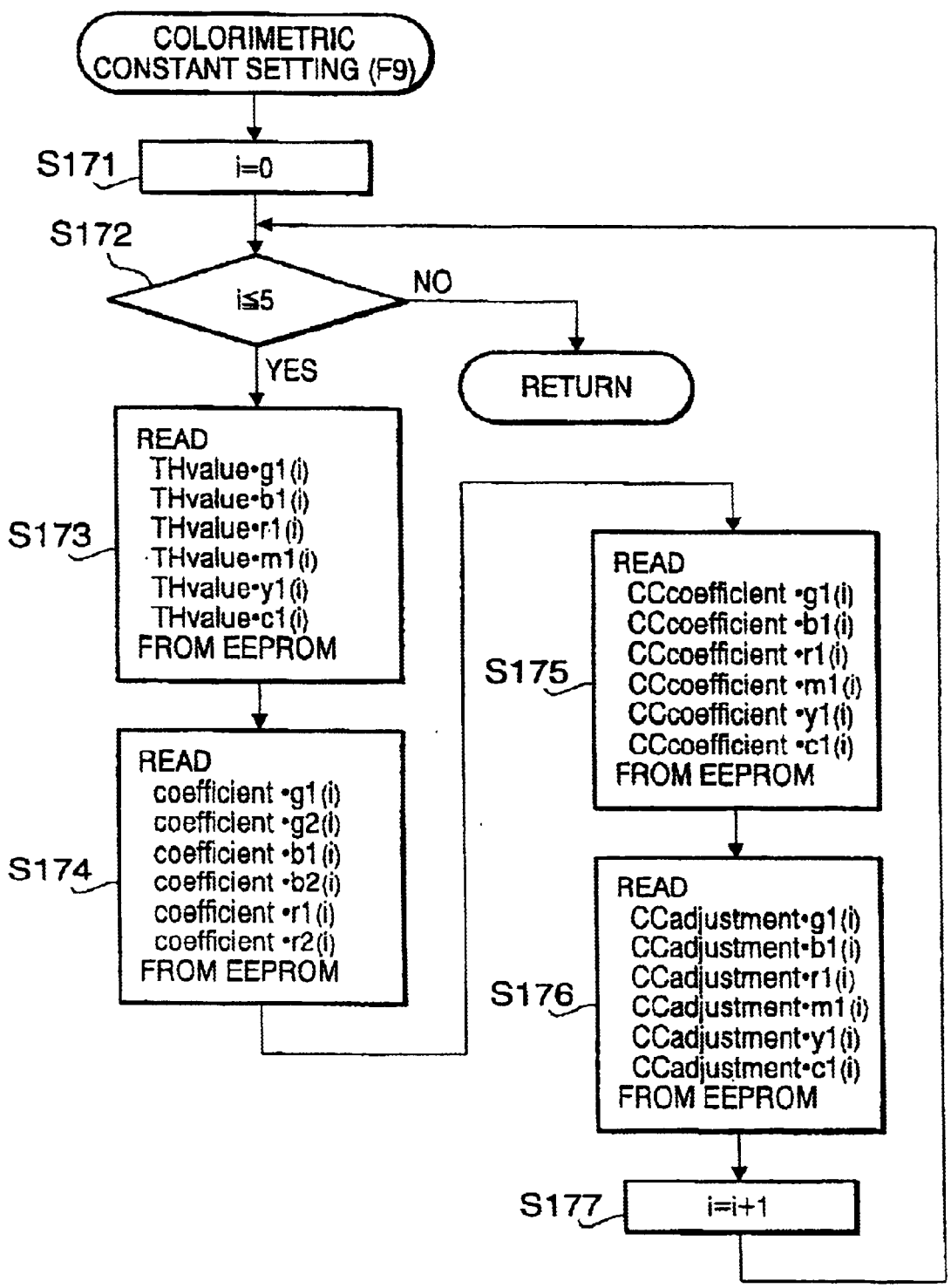
Figure 23:
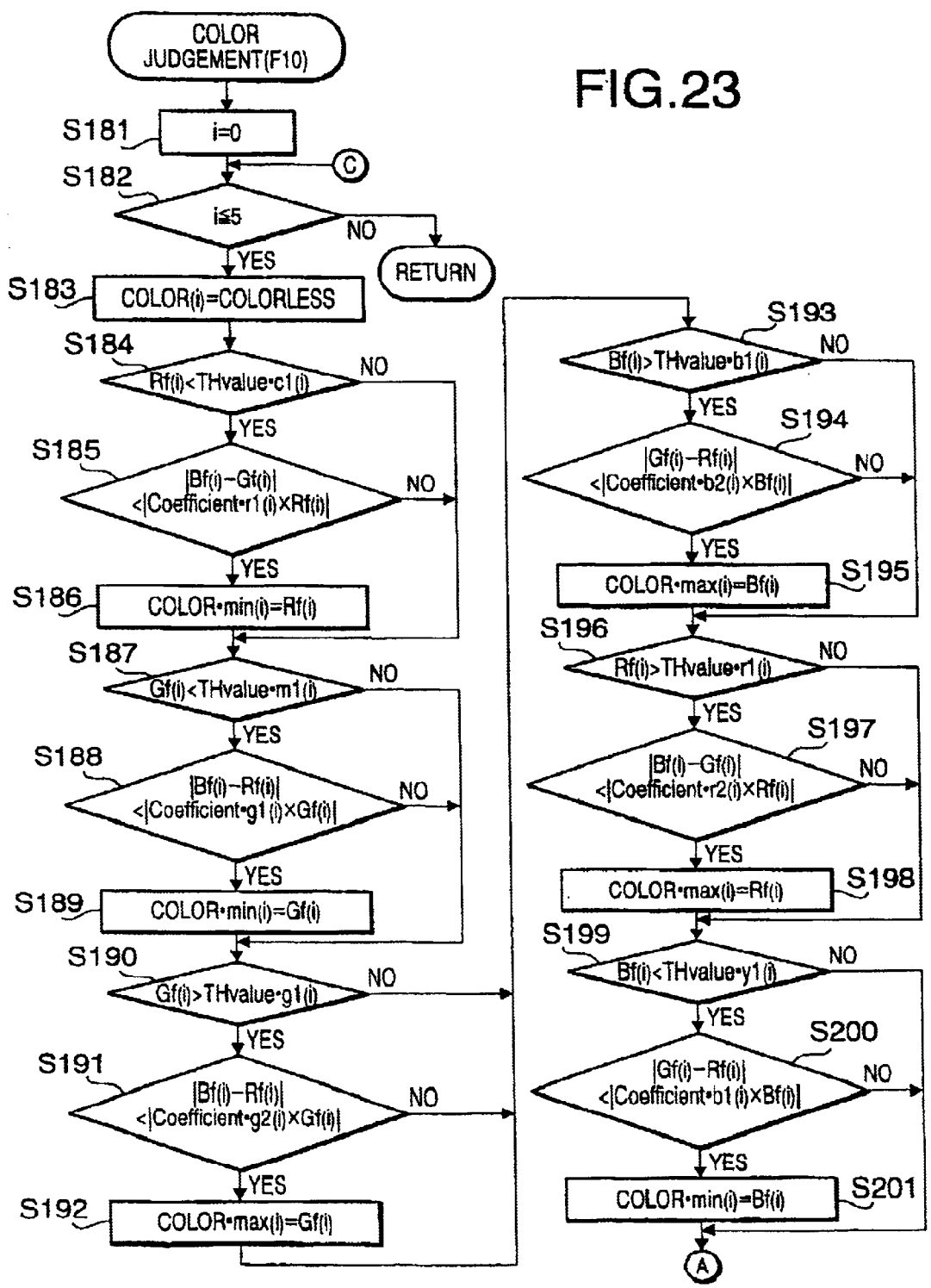
Figure 24:
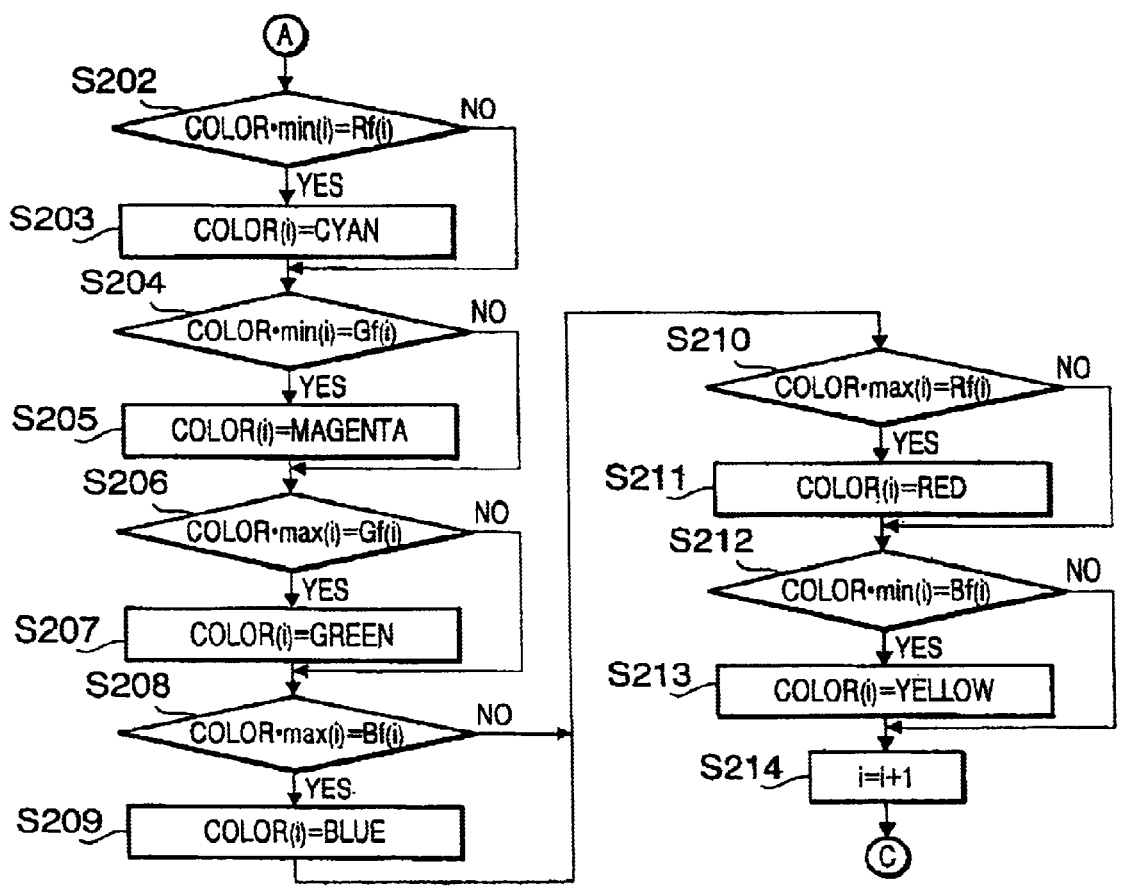
Figure 25:
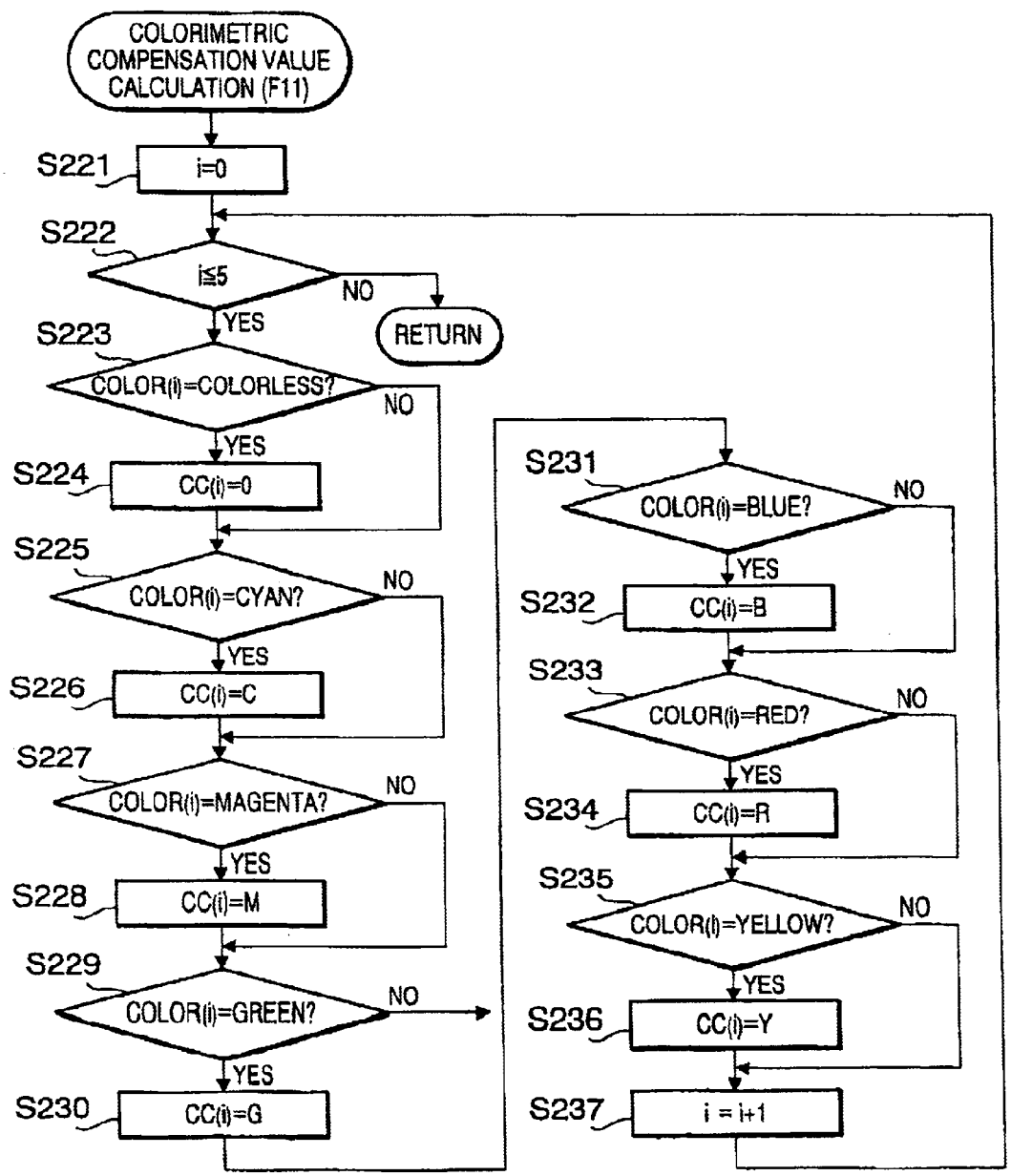
Figure 27:
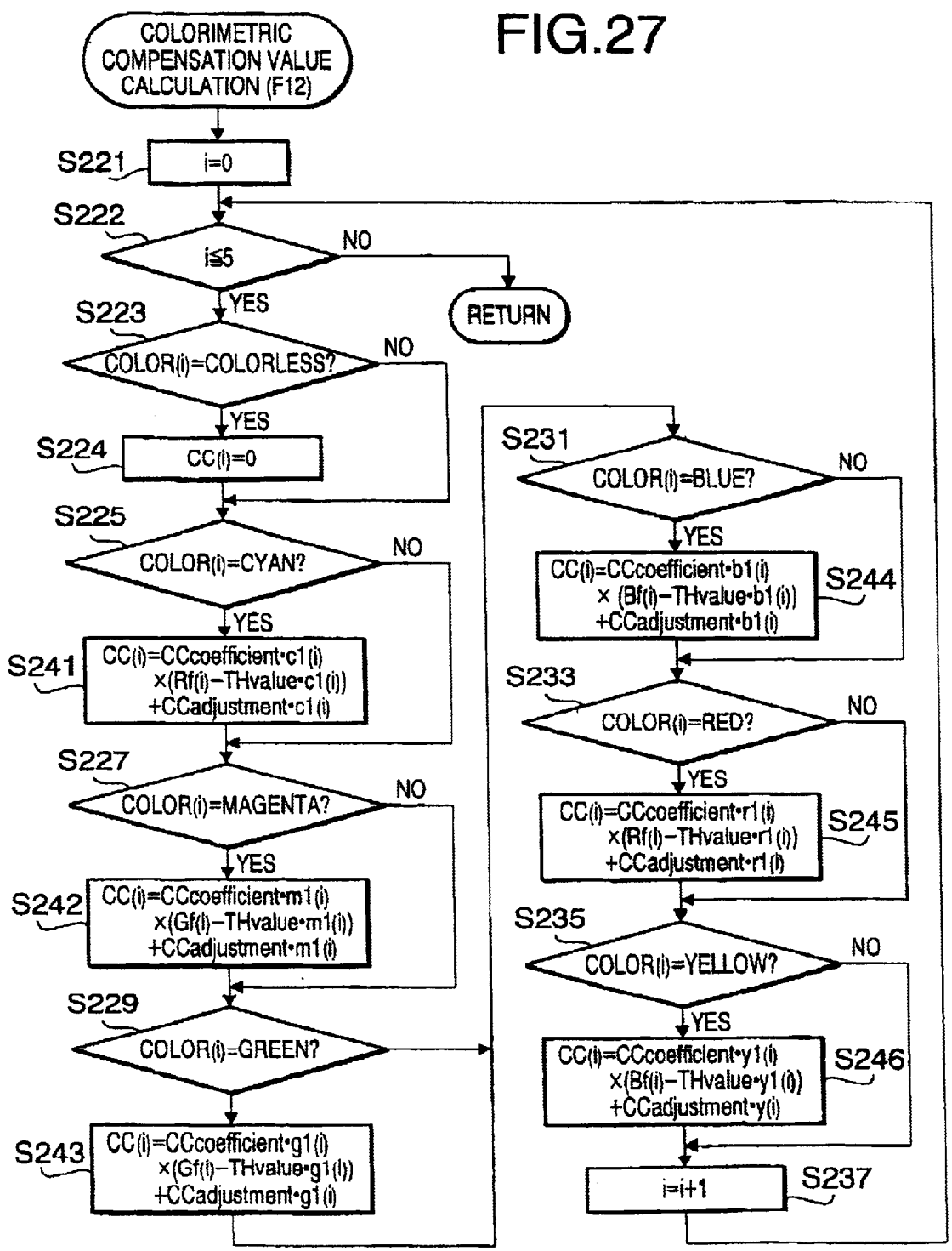
Figure 30:
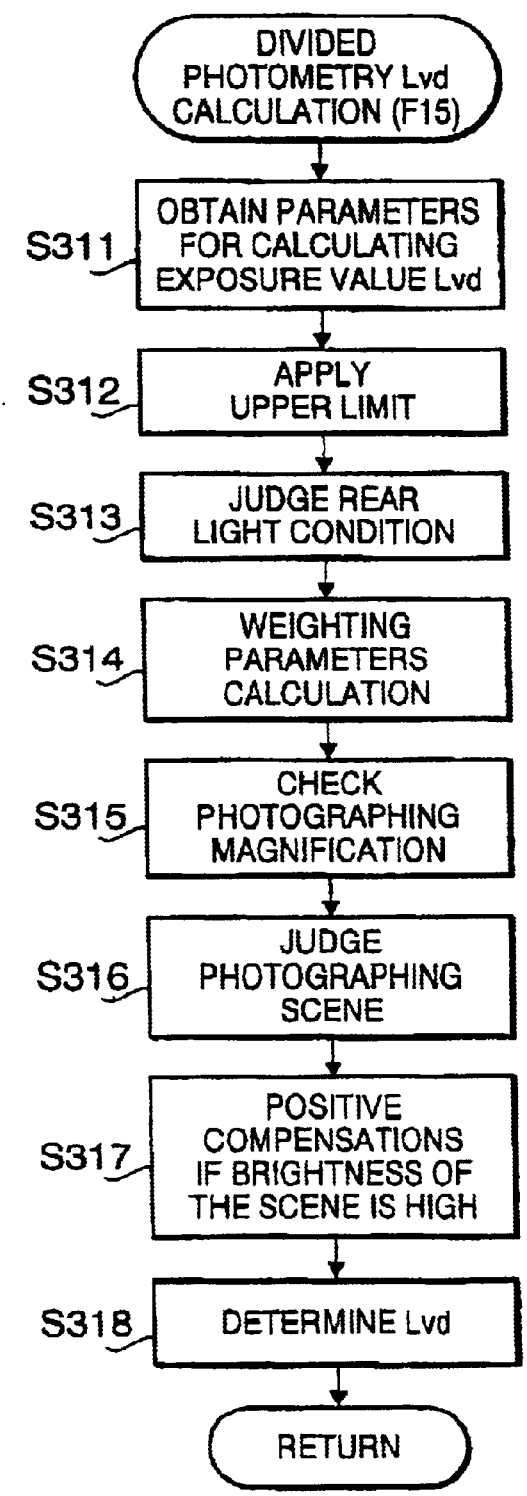
Figure 31:
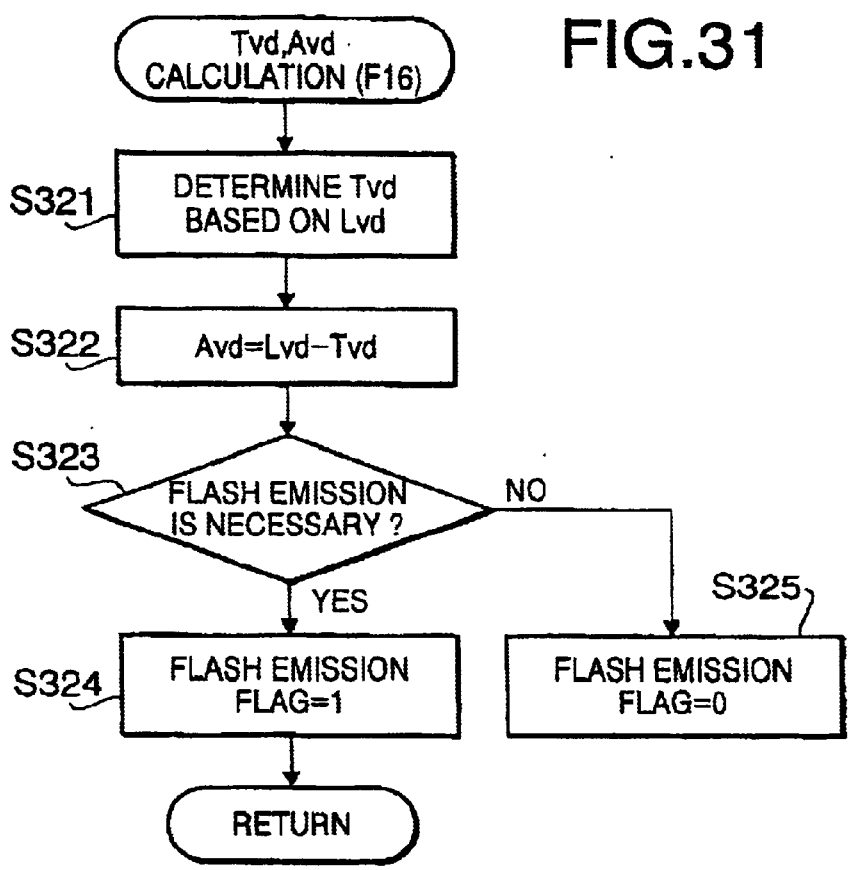
Figure 32:
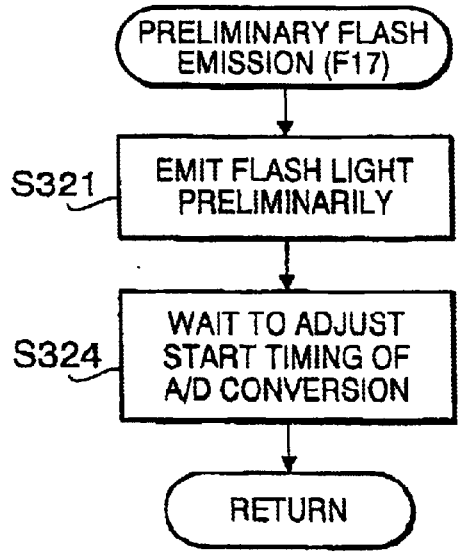
Figure 33:
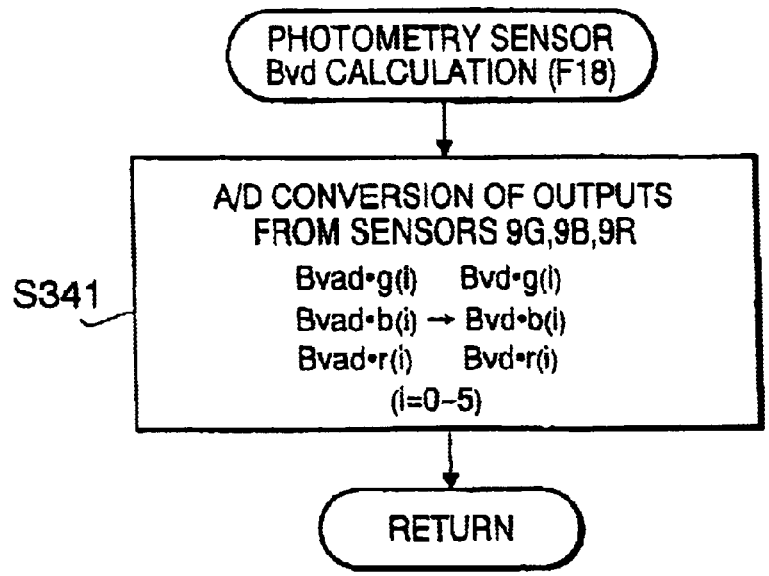
Figure 34:
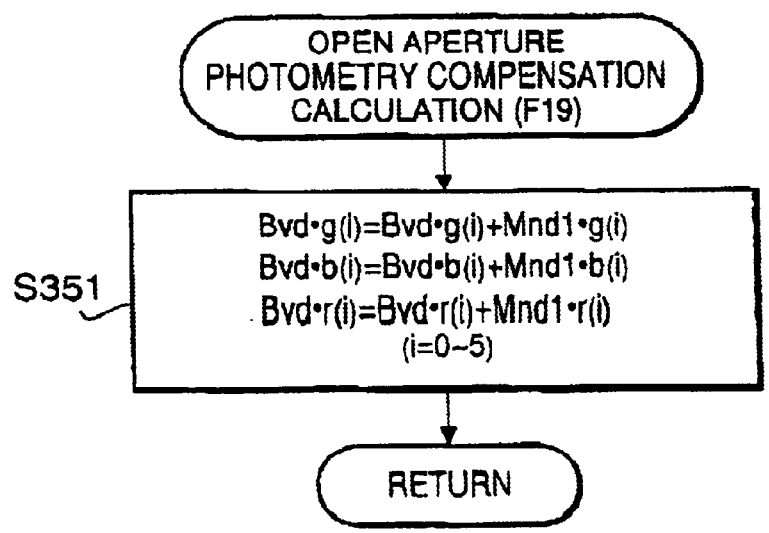
Figure 35:
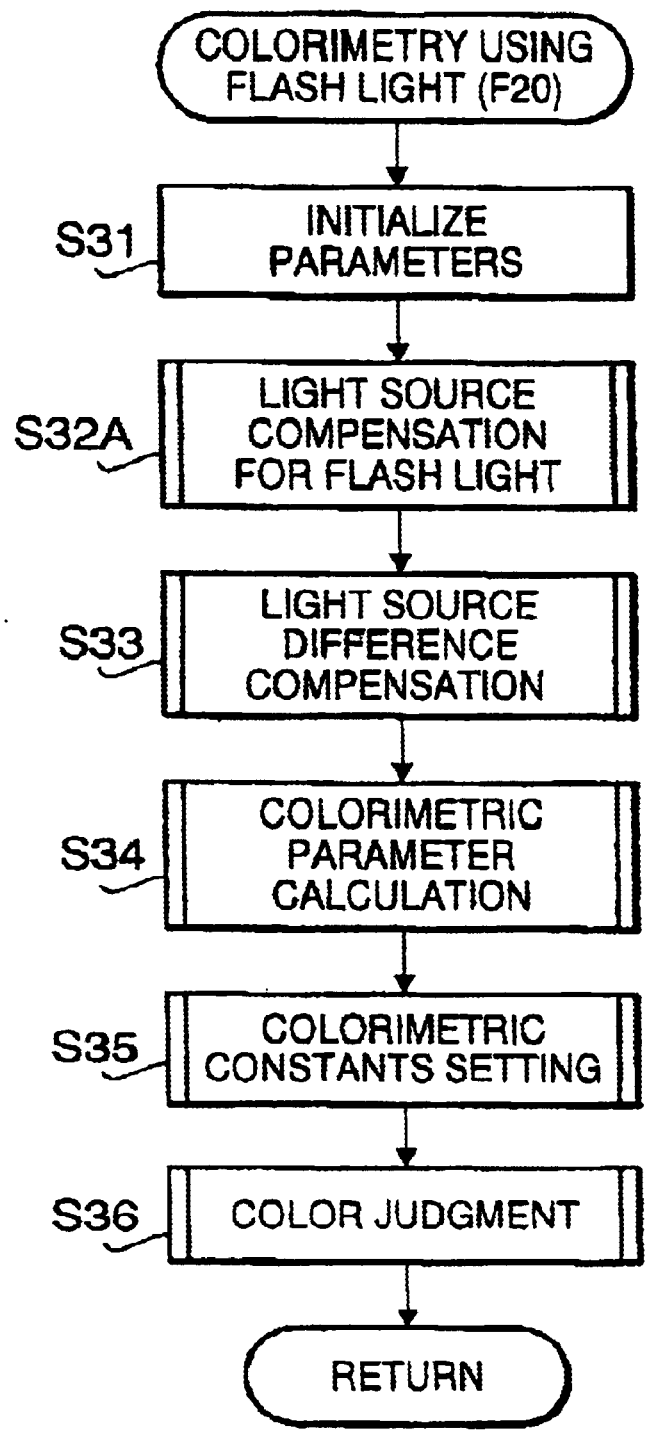
Figure 36:
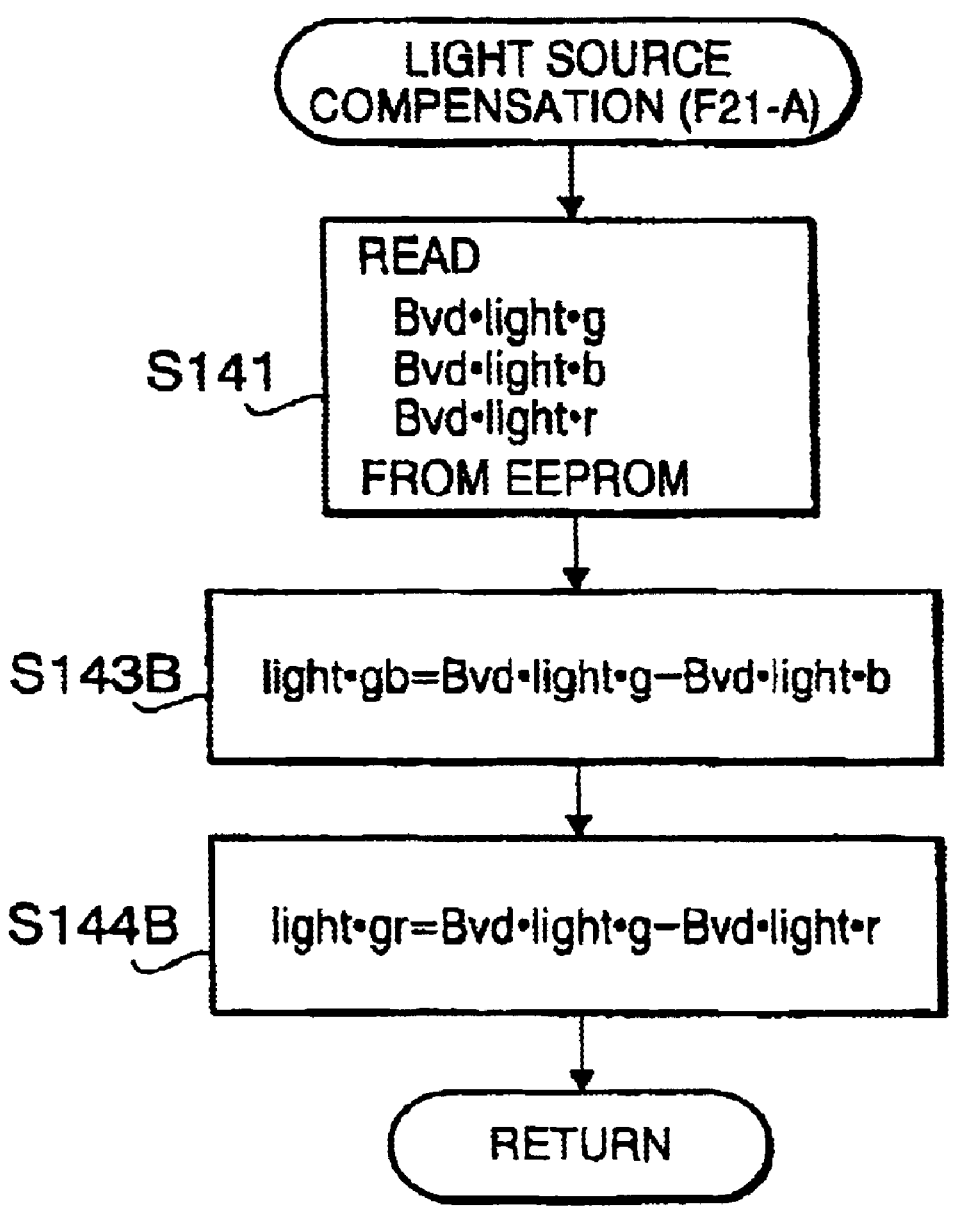
Figure 37:
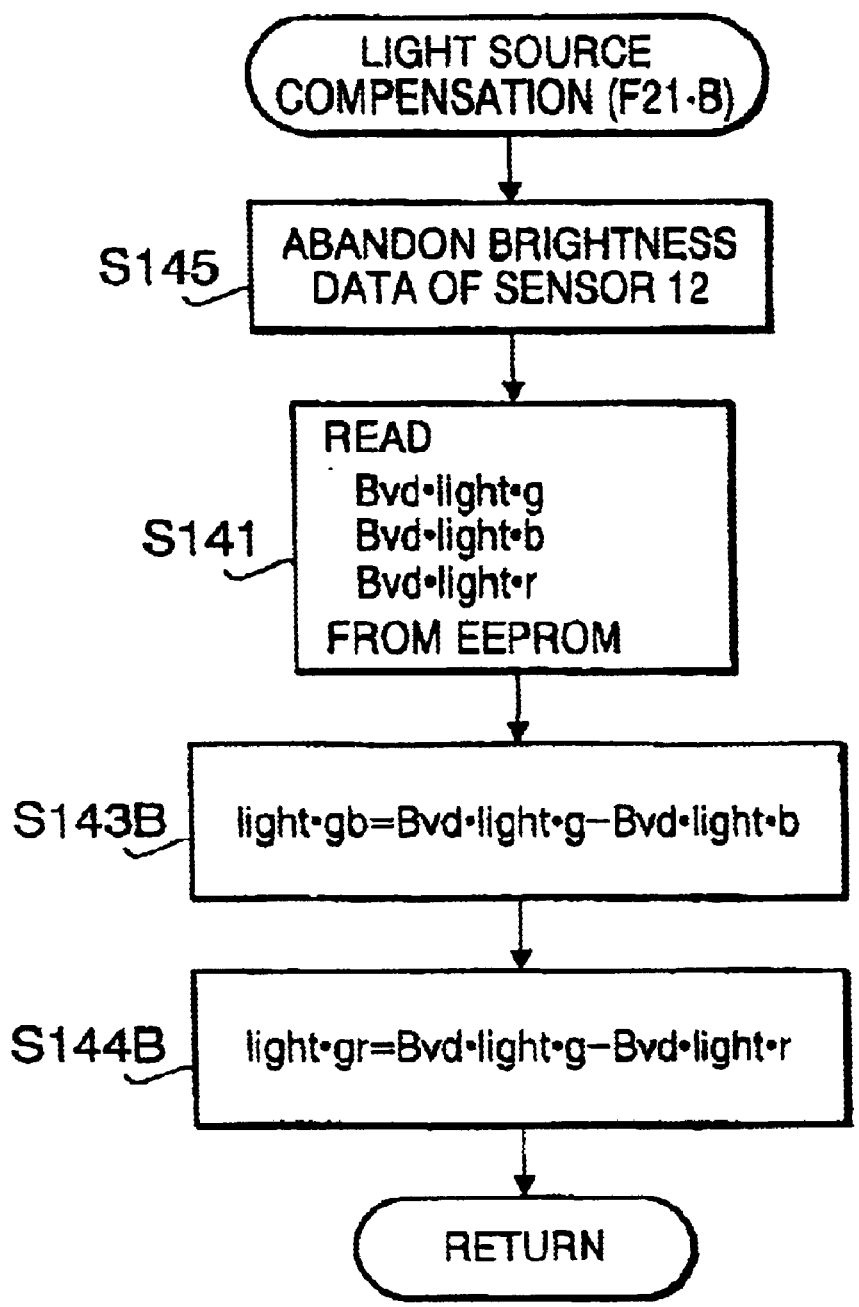
Figure 38:
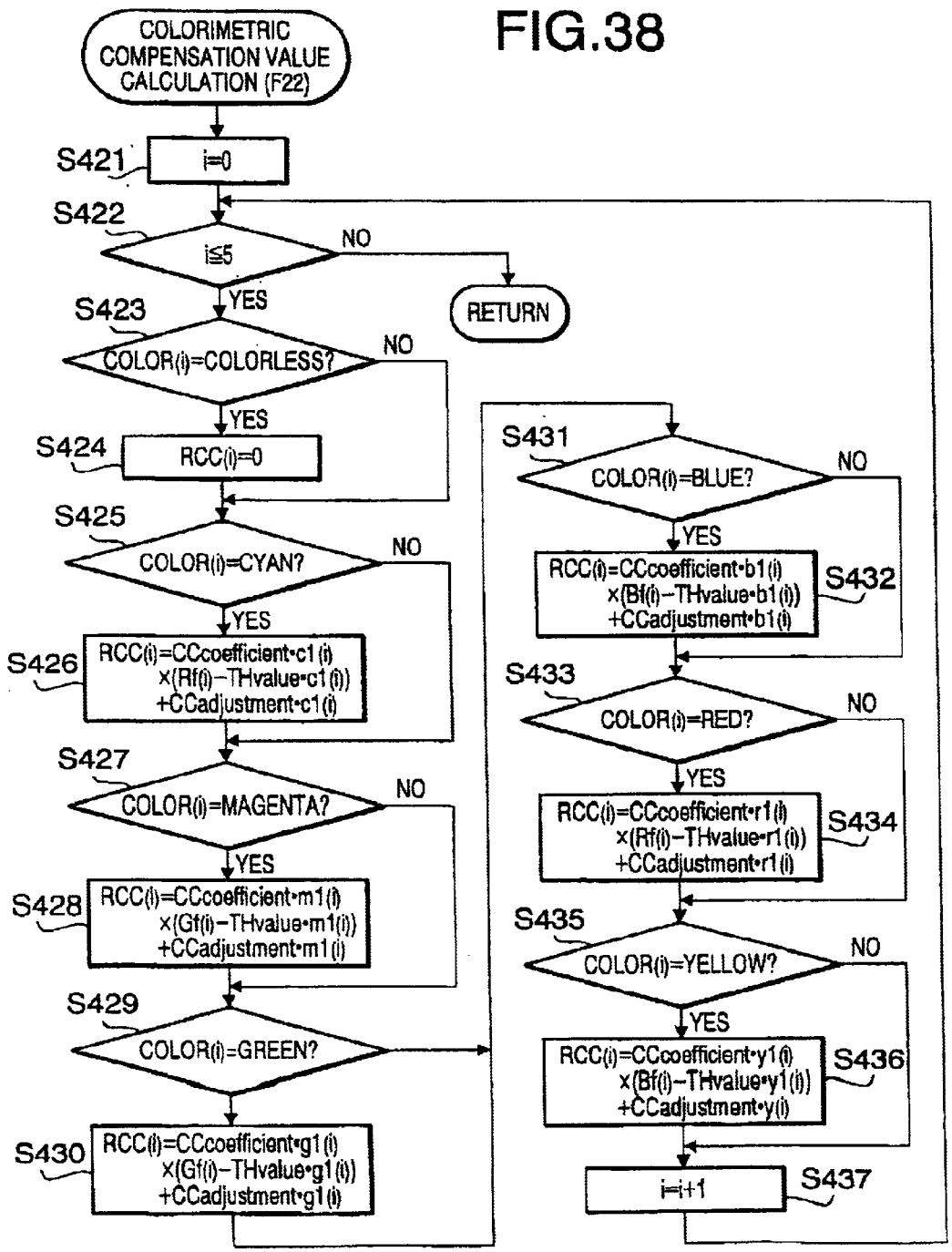
Figure 39:
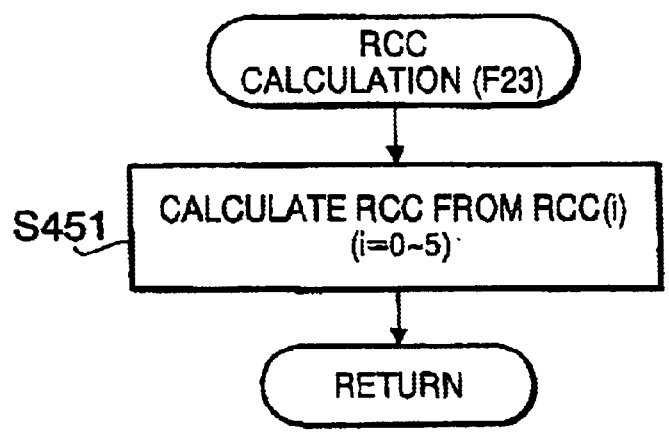

FIG. 4A schematically shows a structure of each of the photometry sensors;

FIG. 4B shows a relationship between the photometry areas of each photometry sensor;

FIG. 5 shows spectral sensitivity characteristics of the green, blue and red light sensors;

FIG. 6 shows a block diagram of main portions of the camera;

FIG. 7 shows a circuit diagram of an automatic flash device provided in the camera;

FIG. 8A shows graphs of change of the voltage Vb which is applied to a negative input terminal of a comparator;

FIG. 8B shows a timing chart of the quenching signal ST when a switch SW2 is ON;

FIG. 8c shows a timing chart of the quenching signal ST when a switch SW2 is OFF;

FIG. 9 shows an example of a relationship between the value of flash controlling levels SXVD and film speeds;

FIG. 10 is a list of various types of procedures executed in the camera;

FIGS. 11A and 11B show a flowchart illustrating a main procedure executed under control of a controller in the camera, according to an embodiment;

FIG. 12 is a flowchart illustrating the "lens communication procedure";

FIG. 13 is a flowchart illustrating the "photometry sensor Bvd calculation procedure" which is executed if a photometry sensor which detects color components of extraneous light is not used;

FIG. 14 is a flowchart illustrating the "photometry sensor Bvd calculation procedure" which is executed if the photometry sensor which detects color components of extraneous light is used;

FIG. 15 is a flowchart illustrating the "open aperture photometry compensation calculation procedure";

FIG. 16 is a flowchart illustrating the "colorimetry procedure";

FIG. 17 is a flowchart illustrating the "light source compensation procedure" which is executed if the photometry sensor which detects color components of extraneous light is not used;

FIG. 18 is a flowchart illustrating the "light source compensation procedure" which is executed if the photometry sensor which detects color components of extraneous light is used;

FIG. 19 is a flowchart illustrating the "light source difference compensation procedure";

FIG. 20 is a flowchart illustrating the "colorimetric parameter calculation procedure";

FIG. 21 is a flowchart illustrating the "colorimetric constants setting procedure";

FIG. 22 shows an example of constants read from an EEPROM;

FIGS. 23 and 24 show a flowchart illustrating the "color judgment procedure";

FIG. 25 shows the "colorimetric compensation value calculation procedure";

FIG. 26 shows an example of the colorimetric compensation values used for the procedure shown in FIG. 25;

FIG. 27 shows an alternative "colorimetric compensation value calculation procedure";

FIG. 28 is a flowchart illustrating an "exposure value (Lvd) calculating procedure";

FIG. 29 is a flowchart illustrating an "exposure value determining procedure";

FIG. 30 is a flowchart Illustrating a "divided photometry Lvd calculation procedure";

FIG. 31 is a flowchart illustrating a "Tvd and Avd calculation procedure";

FIG. 32 is a flowchart illustrating a "preliminary flash light emission procedure";

FIG. 33 Is a flowchart illustrating a "photometry sensor Bvd calculation procedure for RGB color components";

FIG. 34 is a flowchart illustrating a "open aperture photometry compensation calculation procedure for RGB color components";

FIG. 35 is a flowchart illustrating a "colorimetry procedure using flash light";

FIG. 36 is a flowchart illustrating a "light source compensation procedure for the flash light" which is executed if the photometry sensor which detects color components of extraneous light is not used;

FIG. 37 is a flowchart illustrating a "light source compensation procedure for the flash light" which is executed if the photometry sensor which detects color components of extraneous light is used;

FIG. 38 is a flowchart illustrating a "calculation procedure for colorimetric compensation value for reflectivity";

FIG. 39 is a flowchart illustrating a "RCC calculation procedure"; and

Figure 40:
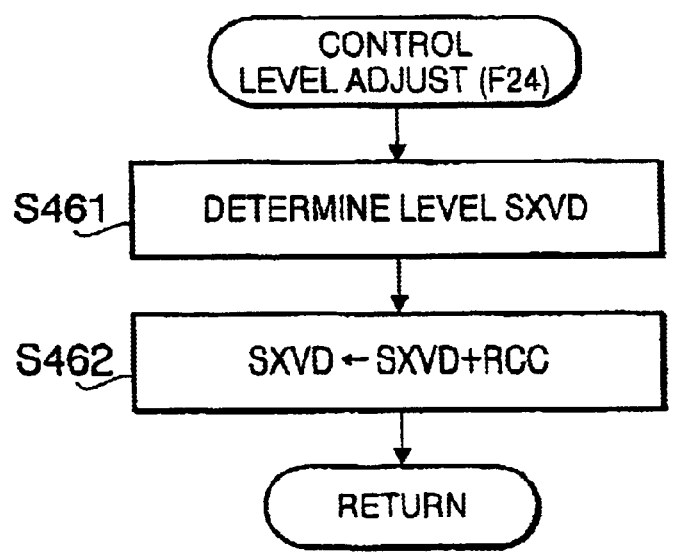

FIG. 40 is a flowchart illustrating a "control level adjusting procedure".

DETAILED DESCRIPTION OF THE EMBODIMENTS

Hereinafter, referring to the accompanying drawings, an embodiment according to the present invention will be described.

Figure 1:
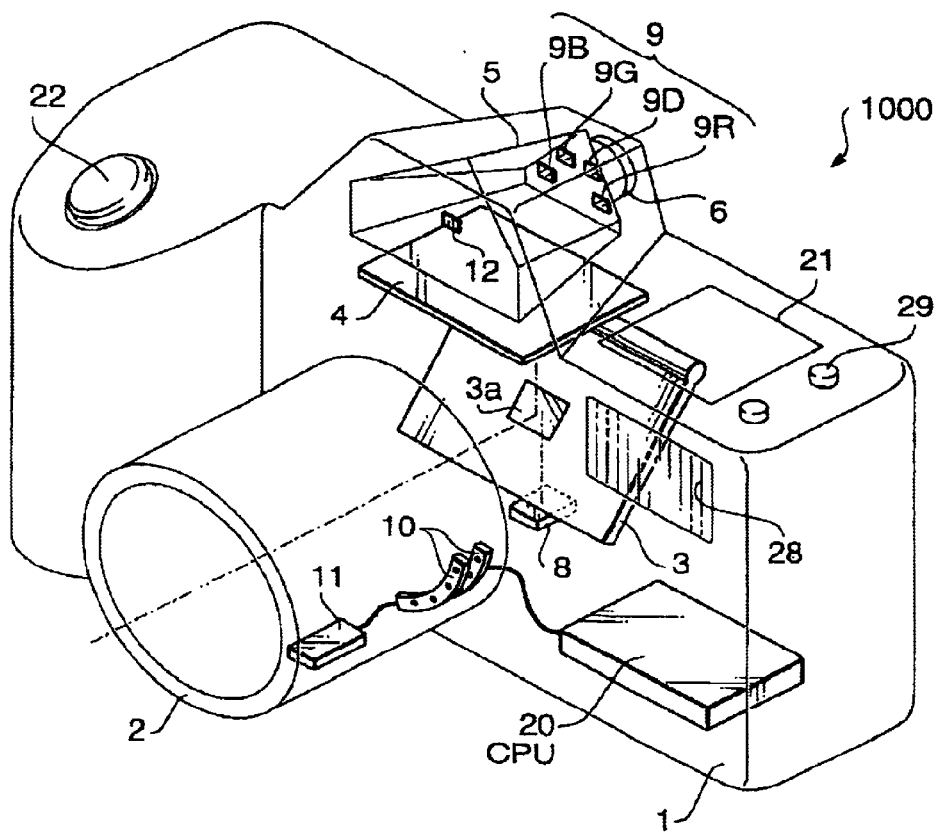
Figure 2:
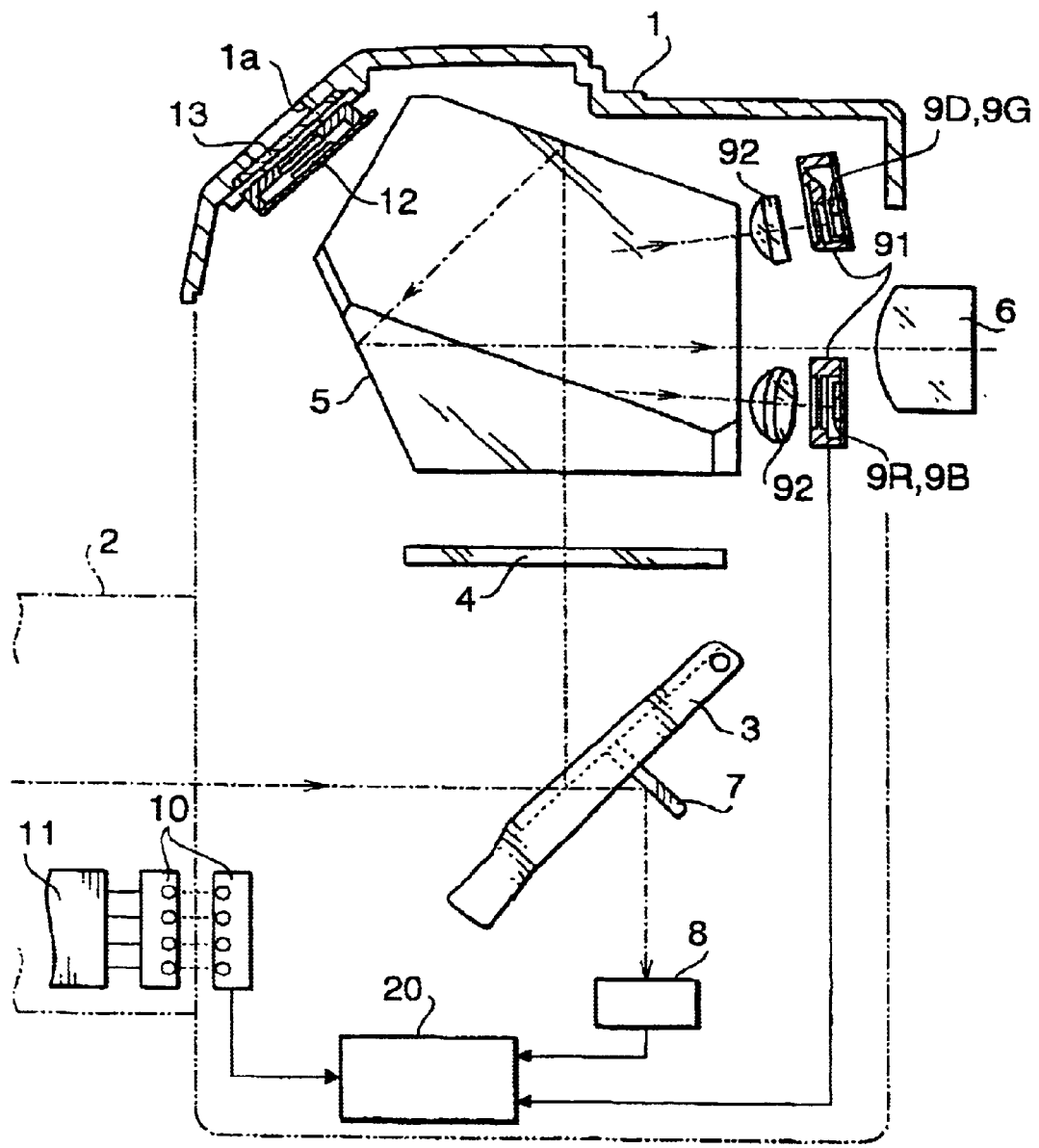

FIG. 1 shows a perspective view of an SLR (Single Lens Reflex) camera 1000 to which a flash control system according to the invention is applied, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a distance measuring device 8. The distance measuring device 8 is configured as a multi-point distance measuring device, and an AF (Automatic focusing) control is performed in accordance with the measurement results of the distance measuring device 8.

On the rear side of the pentagonal prism 5, four photometry sensors 9 (9D, 9R, 9G and 9B) are provided (see FIGS. 1 and 2), each of which functions as a photometry element and receives part of light passed through the photographing lens 2. Based on the outputs of the photometry sensors 9, a photometry operation for determining exposure parameters is executed.

On the front side of the camera body 1, an opening 1a is formed. Under the opening 1a, a milky diffusing panel 13 and a photometry sensor 12 are provided. The photometry sensor 12 receives natural light which is reflected by an object and passed through the opening 1a and the diffusing panel 13.

The photographing lens 2 and the camera body 1 are electrically connected through electrical contacts 10. Thus, a lens ROM 11 built in the photographing lens 2 is electrically connected to a controller 20 accommodated in the camera body 1. On an outer surface of the camera body 1, an LCD (liquid crystal display) 21, and various buttons such as a release button 22 and a photometry mode changeover switch 29 are provided. Furthermore, inside the camera body 1, various mechanisms such as a film winding mechanism are provided. However, such mechanisms are conventionally known, and description thereof will be omitted for the sake of simplicity.

Figure 3A:
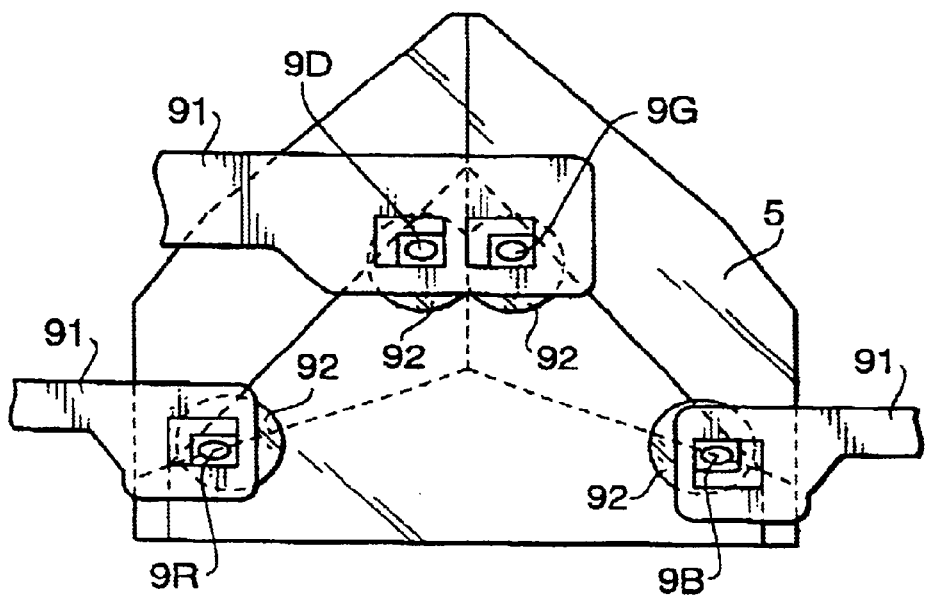
FIG. 3A shows an arrangement of photometry sensors.
Figure 3B:
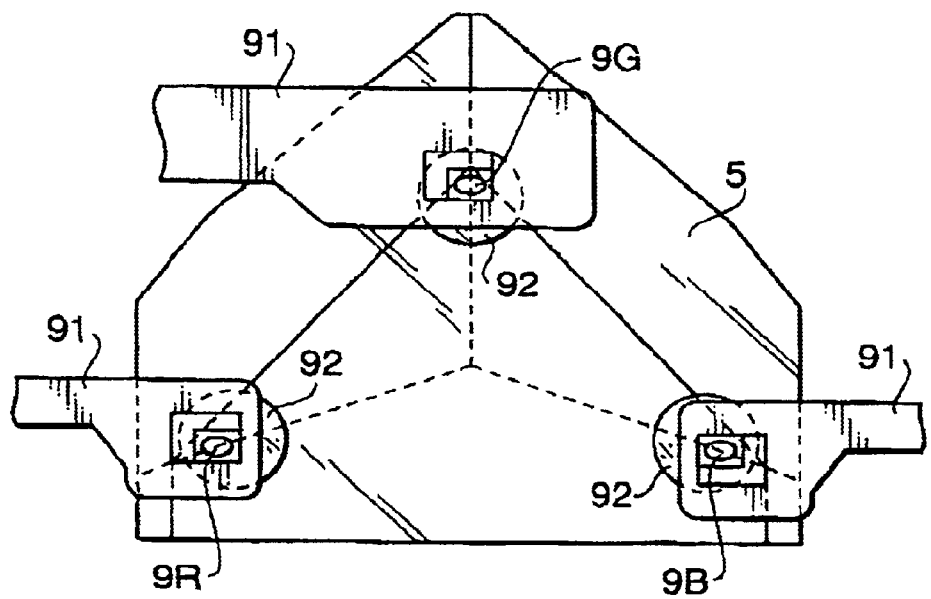
FIG. 3B shows an alternative arrangement of photometry sensors.

FIG. 3A shows a rear view of the pentagonal prism 5. As shown in FIG. 3A, the four photometry sensors 9 include sensors 9D and 9G provided at an upper central portion on the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, an imaging lens 92 is provided to form an object image on each of the sensors 9D, 9G, 9B and 9R (see FIG. 2). FIG. 3B shows an alternative arrangement of photometry sensors, in which the output of the photometry sensor 9D is replaced with the output of the photometry sensor 9G. The alternative arrangement of photometry sensors is described later.

FIG. 4A schematically shows a structure of each of the sensors 9D, 9G, 9B and 9R. As shown in FIG. 4A, each of the sensors 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 4B shows a relationship between the photometry areas A0–A5 and portions of an object. The photometry areas A0–A5 of each sensor receive the light from respective portions of an object as indicated in FIG. 4B. P0–P2 shown in the photometry areas A0–A2 represent distance measuring points defined in the photometry areas.

The photometry sensor 9G is provided with a green filter GF on its light receiving surface, and receives a green component of light, the photometry sensor 9B is provided with a blue filter BF on its light receiving surface, and receives a blue component of light, and the photometry sensor 9R is provided with a red filter RF on its light receiving surface, and receives a red component of light. In this embodiment, the three sensors 9G, 9B and 9R are used as colorimetry elements. Spectral sensitivity characteristics of the sensors 9G, 9B and 9R respectively provided with the green, blue and red filters GF, BF and RF are indicated in FIG. 5. The sensors 9G, 9B and 9R have peaks in sensitivity at approximately 540 nm, 420 nm, and 620 nm, respectively.

The remaining sensor 9D is not provided with a color filter, but a sensitivity compensation filter is provided so that the spectral sensitivity characteristic of the sensor 9D has its peak within a wavelength range of 500–600 nm, which is close to the visual sensitivity characteristic. The sensor 9D is used as a normal light detecting sensor.

The photometry sensor 12 is similar to each of the photometry sensors 9 in structure. That is, the photometry sensor 12 includes the same planar structure photometry IC chip as each of the photometry sensors 9. In the photometry sensor 12, only photometry areas A0–A2 are used. A green filter whose spectral transmission characteristic is equal to the green filter GF provided in the sensor 9G, a blue filter whose spectral transmission characteristic is equal to the blue filter BF provided in the sensor 9B, and a red filter whose spectral transmission characteristic is equal to the red filter RF provided in the sensor 9R are provided on the center area A0, the left area A1, and the right area A2 of the photometry sensor 12, respectively. Therefore, the photometry sensor 12 spectrally resolves extraneous light into the primary colors and detects a green component, a blue component and a red component of extraneous light.

It should be noted that the photometry sensor 12 has the same planar structure photometry IC chip as each of the photometry sensors 9, and spectral transmission characteristics of the green filter, the blue filter and the red filter of the photometry sensor 12 are equal to the green filter GF of the sensor 9G, the blue filter BF of the sensor 9B and the red filter RF of the sensor 9R, respectively. Thus, there is commonality among the photometry sensors 9D, 9G, 9B, 9R, and 12. Therefore, cost reduction and maintaining consistency of the spectral sensitivity characteristics of the photometry sensors can be accomplished.

FIG. 6 shows a block diagram of main portions of the camera 1000. The four sensors 9D, 9G, 9B and 9R output values indicative of quantity of received light (components) to the controller 20, respectively. Also, the photometry sensor 12 output values indicative of quantity of received primary colors of the extraneous light. Further, the output (i.e., a distance value) of the distance measuring device 8 is transmitted to the controller 20, which controls a AF device 25 to perform the automatic focusing operation. Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button 22 is depressed halfway and the photometry switch SWS is turned ON, the controller 20 performs a photometry calculation in accordance with a predetermined algorithm, and calculates an exposure value. Then, the controller 20 controls an exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various types of data.

Furthermore, the controller 20 is connected with an automatic flash device 28 which is constituted of a integration circuit 100 and a light emission circuit 200 shown in FIG. 7. When the shutter button 22 is fully depressed and a light emission circuit 200 starts to emit flash light in synchronization with operation of a shutter, the integration circuit 100 starts to detect flash light reflected from an object. The integration circuit 100 sends a quenching signal ST to the light emission circuit 200 to stop emission of flash light when the quantity of flash light reflected from the object reaches to a predetermined value. Since detailed configuration of the light emission circuit 200 is generally known, its detailed description is omitted.

An operation of the integration circuit 100 which is closely related to the present invention will be described bellow.

As shown in FIG. 7, the integration circuit 100 includes a photoreceptor PDx which receives flash light reflected by the object when the photographing operation is performed, a charging circuit 101 for accumulating electric charges generated by the photoreceptor PDx into a capacitor Cx and generating voltage Vb which corresponds to electric charges accumulated in the capacitor Cx, and a D-A converter 102 which generates a reference voltage Vtt1 which corresponds to a difference voltage between a reference voltage Vs and voltage corresponding to the value of a flash controlling level SXVD input to the D-A converter 102. The charging circuit 101 includes an amplifier Amp, resistances R1 and R2, and switches SW1 and SW2.

Further, the integration circuit 100 includes a comparator 103 which sends the quenching signal ST to the light emission circuit 200 when the magnitude of the voltage Vb corresponding to the amount of the electric charges accumulated in the capacitor Cx reaches the reference voltage Vtt1.

The switch SW1 is ON when the shutter-release switch SWR is OFF (i.e., the photographing operation is not performed) and is switched to OFF when the photographing operation starts. The switch SW2 is used for changing the gain of the integration circuit 100 according to film speed of a film placed in the camera 1000. The automatic flash device 28 is configured to turn the switch SW2 to OFF if a high speed film is placed in the camera 1000.

The D-A converter 102 includes a plurality of resistances placed in series which are used to divide the voltage Vs into a plurality of different voltages. Further, the D-A converter 102 is configured to generate the reference voltage Vtt1 by selecting one of the plurality of different voltages generated by the plurality of resistances based on the value (digital data) of the flash controlling level SXVD.

As described above, when the shutter-release switch SWR is turned to ON (i.e., when the shutter opens), the light emission circuit 200 starts to emit flash light, and the film is exposed to flash light reflected from the object. Simultaneously, the switch SW1 of the integration circuit 100 is turned to OFF. In addition, flash light reflected from the object is received by the photoreceptor PDx, and therefore, the capacitor Cx starts to accumulate electrical charges corresponding to the quantity of light received by the photoreceptor PDx. In this case, the amount of electric charge Q is represented by the equation (1):

$$Q = C \times V = ip \times T \qquad (1)$$

where C represents capacitance of the capacitor Cx, V represents voltage between two electrodes of the capacitor Cx, ip represents current generated by the photoreceptor PDx, and T represents a time period of accumulation of electric charge. Accordingly, the voltage V is represented by the following equation (2):

$$V = (ip \times T) + C \qquad (2)$$

Voltage Va at a point A (see FIG. 7) is represented by the following equation (3):

$$Va = Vs - V = Vs - (ip \times T) + C \qquad (3)$$

Voltage Vb at a point B (see FIG. 7) is changed according to an ON-OFF status of the switch SW2. That is, if the switch SW2 is ON, Vb=Va. If the SW2 is OFF, according to the ratio of the resistance r (R1) and the resistance 3r (R2), voltage Vb is represented by the following equation (4):

$$Vb = Vs - 4 \times V = Vs - 4 \times (ip \times T) + C \qquad (4)$$

The voltage Vb is applied to a negative input terminal of the comparator 103.

The reference voltage Vtt1 generated by the D-A converter 102 is input to a positive input terminal of the comparator 103. That is, a voltage corresponding to the value of the flash controlling level SXVD is applied to the positive input terminal of the comparator 103. When the amount of change of the voltage Vb exceeds the reference voltage Vtt1, the comparator 103 reverses its output, and therefore, the quenching signal ST is sent to the light emission circuit 200 to stop emission of flash light. With this configuration, it becomes possible to stop emission of flash light when the quantity of light received by the photoreceptor PDx reaches a predetermined value. Thus, an automatic flash control operation is performed.

FIG. 8A shows graphs of change of the voltage Vb. FIGS. 8B and 8C show timing charts of the quenching signal ST. In FIG. 8A, a vertical axis is voltage at the negative input terminal of the comparator 103, and a horizontal axis is time. Initially, the voltage Vb is equal to the voltage Vs. When the photoreceptor PDx starts to receive flash light reflected by the object, the voltage Vb starts to decrease (T0). When the amount of change of the voltage Vb reaches the reference voltage Vtt1 (T1 or T2), the quenching signal ST is output. As shown in FIG. 8A, the gradient of a graph showing change of the voltage Vb (i.e., a gain of an amplifier) when the switch SW2 is OFF is four times greater than the gradient of a graph showing change of the voltage Vb when the switch SW2 is ON. Therefore, it becomes possible to stop emission of flash light in a shorter time period when a high-speed film is used than a time period when a low-speed film is used.

As described above, the reference voltage Vtt1 can be controlled by changing the value of the flash controlling level SXVD which is input to the D-A converter 102. That is, in FIG. 8A, the reference voltage Vtt1 in FIG. 8A can be adjusted. Therefore, it becomes possible to control the quantity of emission of flash light by adjusting the time at which the quenching signal ST is output.

FIG. 8B shows a timing chart of the quenching signal ST when a switch SW2 is ON, in which the quenching signal ST is asserted at time T2. FIG. 8c shows a timing chart of the quenching signal ST when a switch SW2 is OFF, in which the quenching signal ST is asserted at time T1.

FIG. 9 shows an example of a relationship between the value of flash controlling levels SXVD and film speeds. By inputting the value of the flash controlling level SXVD to the D-A converter 102 according to the relationship shown in FIG. 9, the value of D/A step is determined and the reference voltage Vtt1 corresponding to the determined D/A step is generated. Thus, it is possible to control emission of flash light according to film speed.

According to the embodiment of the invention, by automatically changing the flash controlling level SXVD according to the reflectivity of objects, photographing using flash light can be performed at correct exposure under conditions where objects have different reflectivity. Hereinafter, a flash control operation and the photometry operation will be described in detail.

FIG. 10 is a list of various types of procedures executed in the camera 1000. In FIG. 10, names of the various types of procedures and the corresponding reference numbers are shown. As shown in FIG. 10, the camera 1000 has two basic configurations of software. In first type of configuration of software, the photometry sensor 12 is not used, and procedures of F3-A, F6-A and F-21A are executed, but the procedures of F3-B, F6-B and F21-B are not executed. In second type of configuration of software, the photometry sensor 12 is used, and procedures of F3-B, F6-B and F21-B are executed in place of the procedures of F3-A, F6-A and F21-A. It should be noted that the photometry sensor 12 shown in FIGS. 1 and 2 can be omitted if the photometry sensor 12 is not used. The camera 1000 may be designed such that only one type of configuration of software is implemented therein. Alternatively, the camera 1000 may be configured to select one of the configurations of software by using a selecting device provided therein (not shown).

FIGS. 11A and 11B show a flowchart illustrating a main procedure executed under control of the controller 20. Initially, in step S11, it is judged whether the photometry switch SWS is ON or not. If the photometry switch SWS is turned ON (S11:YES), a "lens communication procedure" is executed (S12) so that the controller 20 receives data intrinsic to the photographing lens 2 currently mounted onto the camera body 1. Specifically, the data intrinsic to the photographing lens 2 includes an open f-number (full aperture), a focal length of the photographing lens 2, an exit pupil position and the like, which may affect the photometry calculation. The data is transmitted from the lens ROM 11 in the photographing lens 2 to the controller 20 through the electrical contacts 10. In S12A, a distance measuring operation is performed with respect to the distance measuring points P0–P2.

Then, a "photometry sensor output Bvd calculation procedure" is executed (S13). In this procedure, the photometry sensors 9 (9D, 9G, 9B and 9R) output analog photometry values which are obtained by receiving light passed through the photographing lens 2, reflected by the quick return mirror 3, and passed through the pentagonal prism 5. Then, the analog values output by the photometry sensors 9 are converted to brightness values Bvd.

It should be noted that the photometry is performed for each of the photometry areas A0–A5, and photometry values Bvd(i) (i being integers 0–5 corresponding to the photometry areas A0–A5) are obtained. Then, using the photometry values Bvd(i) obtained in S13 and the data intrinsic to the photographing lens 2 obtained in S12, an "open aperture photometry compensation calculation procedure" is performed in S14, thereby individual photometry errors depending on the photographing lens 2 being canceled.

In step S15, based on the photometry values Bvd(i) corresponding to the sensors 9R, 9B and 9G for the RGB (Red, Green and Blue) color components, a "colorimetry procedure" is executed to determine the color of an object for each of the photometry areas A0–A5. Then, for each of the photometry areas A0–A5, a colorimetric compensation value CC(i) is obtained based on the determined color of the object by executing an "colorimetric compensation value calculation procedure" in S16. In S17, an "exposure value calculating procedure" is executed, where the colorimetric compensation values CC(i) are added to the photometry values Bvd(i), respectively, and an exposure value Lvd is obtained based on the compensated photometry values Bvd (i). In the exposure value calculation procedure (S17), in accordance with the photometry mode set by the photometry mode changeover switch 29, a calculation method is determined, and then, based on the photometry values Bvd(i), the exposure value Lvd is calculated using the determined calculation method.

In step S18, a shutter speed Tvd and an aperture value Avd are calculated based on the exposure value Lvd calculated in S17. For example, the shutter speed Tvd and the aperture value Avd are calculated according to an algorithm of shutter priority. Further, in step S18, it is judged whether there emission of flash light is necessary or not. If emission of flash light is necessary, a flash emission flag is set to 1.

Next, it is judged whether the shutter-release switch SWR is ON. If the shutter-release switch SWR is ON (S19:YES), it is judged whether the flash emission flag is 1 (S21) as shown in FIG. 11B. If the flash emission flag is 0 (S21:NO), the photographing operation without emitting flash light is performed under control of the exposure control device 23 in accordance with the calculated exposure value LVD (S30). If it is judged that the shutter-release switch SWR is not ON (S19:NO), control proceeds to step S20, where the controller 20 judged whether a photometry timer is OFF. Steps S12–S19 are repeated until a predetermined time has elapsed (i.e., until the photometry timer is tuned to OFF). If the predetermined time has elapsed (S19:YES), control returns to step S1.

If it is judged that the flash emission flag is 1 (S21:YES) as shown in FIG. 11B, control proceeds to step S22, where a "preliminary flash light emission procedure" is performed. At step S23, a "colorimetric sensor output calculation procedure" is performed. In step S23, Bvd(i) corresponding to the sensors 9R, 9B and 9G for the RGB (Red, Green and Blue) color components are calculated by receiving flash light reflected by the object with the sensors 9R, 9B and 9G.

Then, using the photometry values Bvd(i) obtained in S23 and the data intrinsic to the photographing lens 2 obtained in S12, an "open aperture photometry compensation calculation procedure for the colorimetric sensor" is performed in S24, thereby individual photometry errors depending on the photographing lens 2 being canceled.

In step S25, a "colorimetry procedure using flash light" is executed to determine the color of an object for each of the photometry areas A0–A5. Then, for each of the photometry areas A0–A5, a colorimetric compensation value of reflectivity RCC(i) is obtained based on the determined color of the object by executing an "calculation procedure for colorimetric compensation value for reflectivity" in S26. Next, using the colorimetric compensation values of reflectivity RCC(i), a compensation value for reflectivity RCC of the whole of the object is obtained by executing a "RCC calculation procedure" (S27).

In step S28, a "control level adjusting procedure" is performed to adjust the value of the flash controlling level SXVD (i.e., the reference voltage Vtt1) based on the compensation value for reflectivity RCC calculated in S27. Adjustment of the SXVD is executed according to the following operation:

SXVD←SXVD+CC

In step S29, an exposure control operation using flash light is performed under control of the exposure control device 23 while emission of flash light is controlled by the automatic flash device 28.

FIG. 12 is a flowchart illustrating the "lens communication procedure (F2)", which is called at S12 of the main procedure shown in FIG. 11A.

In the lens communication procedure, the controller 20 accesses the lens ROM 11 through the electrical contacts 10, and retrieves the data intrinsic to the photographing lens 2 stored in the lens ROM 11 (S101). The retrieved data is stored in the RAM 27 of the controller 20, and control returns. Items included in the data intrinsic to the photographing lens 2 are, for example, a lens type, lens data, the shortest focusable distance, a focusable range, a focal length of the photographing lens, an exit pupil position, an open f-number, an aperture efficiency and the like. In this embodiment, the controller 20 retrieves at least the focal length, the exit pupil position, the open f-number and the aperture efficiency, and stores the retrieved data in the RAM 27.

FIGS. 13 and 14 are flowcharts illustrating the "photometry sensor output Bvd calculation procedure", which are called at S13 in the main procedure shown in FIGS. 11A and 11B. As described above, if the photometry sensor 12 is not used, the procedure shown in FIG. 13 (F3-A) is executed, and if the photometry sensor 12 is used, the procedure shown in FIG. 14 (F3-B) is executed.

In these procedures, digital data values Bvad(i) (where, i=0, 1, . . . , 5) which represents A/D converted output voltages (analog data) of the photometry areas Ai (i=0, 1, . . . , 5) of the photometry sensor 9D for normal light are obtained. Further, data Bvad·g(i), Bvad·b(i) and Bvad·r(i) which represent A/D converted values of the output voltages of the photometry areas Ai (i=0, 1, 2, . . . 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad·r(i) (i=0, 1, 2, . . . 5) are also adjusted to the brightness values Bvd·g(i), Bvd·b(i) and Bvd·r(i), respectively (S112).

In the procedure in which the photometry sensor 12 is not used (FIG. 13), after S112 is executed, control returns to the main procedure.

In the procedure in which the photometry sensor 12 is used (FIG. 14), after S112 is executed, control proceeds to step S113. In S113, Bvad·wb(i) which are the A/D converted values of the photometry areas Ai (i=0, 1, 2) of the photometry sensor 12 are also adjusted to the brightness values Bvd·wb(i).

It should be noted that the A/D conversion method employed in S111, S112 and S113 is a well-known method for converting a quantity of analogue value into digital data, and therefore, description thereof is not given herein.

FIG. 15 is a flowchart illustrating the "open aperture photometry compensation calculation procedure (F4)" which is called at S14 of the main procedure shown in FIGS. 11A and 11B.

At S121, an open aperture photometry compensation value Mnd1(i) is calculated based on the focal length, the exit pupil position, the open f-number and the aperture efficiency which have been retrieved from the ROM 11 and stored in the RAM 27.

The open aperture photometry compensation values Mnd1(i) are obtained as follows. Firstly, compensation values mv1, mv2, mv3 and mv4 for compensating for shift amounts with respect to the reference photometry values due to the individual differences of the optical characteristics of the cameras, and the focal length, the exit pupil position, the open f-number and the aperture efficiency, are determined. Then, the sum of the compensation values mv1+mv2+mv3+mv4 is obtained, which sum is referred to as the open aperture compensation value Mnd1(i). Similarly, corresponding to the photometry sensors 9G, 9B and 9R, the open aperture compensation values Mnd1·g(i), Mnd1·b(i), and Mnd1·r(i) are calculated. Then, the open aperture compensation value Mnd1(i) is added to the brightness value Bvd(i), and then the sum is determined as a new brightness value Bvd(i). Thus, the following calculation is executed at S121:

$Bvd(i)=Bvd(i)+Mnd1(i).$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$Bvd·g(i)=Bvd·g(i)+Mnd1·g(i).$ $Bvd·b(i)=Bvd·b(i)+Mnd1·b(i).$ $Bvd·r(i)=Bvd·r(i)+Mnd1·r(i).$

As a result, each brightness value is free from the effect of the individual differences of photographing lenses 2 coupled to the camera body 1.

At S15 of the main procedure shown in FIG. 11A, a "colorimetry procedure" is called, which is shown in FIG. 16. In the "colorimetry procedure (F5)", the color of the object is detected, and colorimetric compensation values CC(i) are calculated in accordance with the detected color of the object.

At S31, colorimetric parameters are initialized (i.e., colorimetric parameters are set to initial values). At S32, a "light source compensation procedure" is executed to obtain compensation values for the effects of the color temperature of the light source. At S33, a "light source difference compensation procedure" is executed using the compensation values obtained at S32. At S34, a "colorimetric parameter calculation procedure" for obtaining colorimetric parameters, which will be used for execution of a "colorimetric judgment procedure", is executed. At S35, a "colorimetric constants setting procedure" is executed to set constants used for color measurement. At S36, a "color judgment procedure" for judging the color based on the parameters and constants obtained in the preceding steps is executed.

FIGS. 17 and 18 are flowcharts illustrating the "light source compensation procedures" called at S32 of FIG. 16. As described above, if the photometry sensor 12 is not used, the procedure shown in FIG. 17 (F6-A) is executed, and if the photometry sensor 12 is used, the procedure shown in FIGS. 18 (F6-B) is executed.

At first, the flowchart shown in FIG. 17 will be described. In the embodiment, when the initial Bvd value of the photometry sensors 9 is determined, a predetermined light source (light source A) for adjustment is used. When a photographing is to be executed, the Bvd should be compensated in accordance with the actually used light source, for example, the sunlight. In the procedure shown in FIG. 17, relative compensation values of B (blue) and R (red) components with respect to the value for the G (green) component are obtained, and the compensation is performed.

Specifically, for the color components G, B and R, the brightness data Bvd·light·g, Bvd·light·b, and Bvd·light·r, are retrieved from the EEPROM 26 (S141). Then, a light source adjustment value adj·sun·b for the photometry sensor 9B and a light source adjustment value adj·sun·r for the photometry sensor 9R with respect to the value for G component are retrieved from the EEPROM 26 (S142, S145). The light source adjustment values are as follows.

$adj·sun·b=+8$ $adj·sun·r=-4$

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143).

$light·gb=Bvd·light·g-Bvd·light·b+adj·sun·b$

Similarly, a light source compensation value light·gr for the photometry sensor 9R is obtained as follows (S144).

$light·gr=Bvd·light\ g-Bvd·light·r+adj·sun·r$

Next, the light source compensation procedure shown in FIG. 18, in which the photometry sensor 12 is used, will be described. In this procedure, values respectively corresponding to the brightness data Bvd·light·g, Bvd·light·b and Bvd·light·r which are retrieved from the EEPROM 26 are retrieved from the photometry sensor 12.

At step S141A, the photometry data Bvad·wb(i) (i=0, 1, 2) which are the A/D converted values of the photometry areas A1 (i=0, 1, 2) of the photometry sensor 12 are retrieved. Then, the light source adjustment value adj·sun·b for the photometry sensor 9B and the light source adjustment value adj·sun·r for the photometry sensor 9R with respect to the value for G component are retrieved from the EEPROM 26 (S142, S145). Similar to the above, the light source adjustment values are as follows.

$$adj\cdot sun\cdot b = +8$$

$$adj\cdot sun\cdot r = -4$$

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143A).

$$light\cdot gb = Bvd\cdot wb(0) - Bvd\cdot wb(1) + adj\cdot sun\cdot b$$

Similarly, a light source compensation value light·gr for the photometry sensor 9R is obtained as follows (S144A).

$$light\cdot gr = Bvd\cdot wb(0) - Bvd\cdot wb(2) + adj\cdot sun\cdot r$$

FIG. 19 is a flowchart illustrating the "light source difference compensation procedure (F7)", which is called at S33 in FIG. 16. In this procedure, based on the light source compensation values for light·gb and light·gr for B and R, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B for the B component, the following calculation is executed.

$$Bvd\cdot b(i) = Bvd\cdot b(i) + light\cdot gb.$$

At S152, for each photometry area of the photometry sensor 9R for the R component, the following calculation is executed.

$$Bvd\cdot r(i) = Bvd\cdot r(i) + light\cdot gr.$$

With the above compensation, the photometry sensors 9G, 9B and 9R has the same photometric characteristics for the external light source such as the sunlight.

FIG. 20 is a flowchart illustrating the "colorimetric parameter calculation procedure (F8)", which is called at S34 of FIG. 16. In this procedure, colorimetric parameters used in the colorimetric judging are calculated. As the colorimetric parameters, parameters Gf(i) for G component, parameters Bf(i) for B component, and parameters Rf(i) for R component are calculated (S161, S162 and S163) according to the following formulate.

$$Gf(i) = Bvd\cdot g(i) - \{Bvd\cdot b(i) + Bvd\cdot r(i)\}/2;$$

$$Bf(i) = Bvd\cdot b(i) - \{Bvd\cdot g(i) + Bvd\cdot r(i)\}/2;$$

and $$Rf(i) = Bvd\cdot r(i) - \{Bvd\cdot b(i) + Bvd\cdot g(i)\}/2.$$

FIG. 21 is a flowchart illustrating the "colorimetric constants setting procedure (F9)", in which the colorimetric constants are retrieved from the EEPROM 26. The colorimetric constants include: threshold values for color judgment; coefficients for color judgment; coefficients for calculating colorimetric compensation values; and adjustment values for calculating the colorimetric compensation values, which are represented by valuables as indicated below:

threshold values for color judgment: THvalue·*1(i);

coefficients for color judgment: coefficient·#1(i) and coefficient·#2(i);

coefficients for calculating colorimetric compensation values: CCcoefficient·*1(i);

adjustment values for calculating the colorimetric compensation values: CCadjestment·*1(i).

In the above indication, a symbol * represents g (green), b (blue), r (red), m (magenta), y (yellow) or c (cyan), and a symbol # represents g (green), b (blue) or r (red).

In this procedure, for all the photometry areas A0–A5 of the sensors 9, the colorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. If it is judged that i>6 at S172 (S172:NO), the procedure is ended. The constants read from the EEPROM 26 are stored in the RAM 27 of the controller 20. FIG. 22 shows an example of the constants read from the EEPROM 26.

FIGS. 23 and 24 show a flowchart illustrating the "color judgment procedure (F10)". The procedure judges the color of the object for each of the photometry areas A0–A5.

At S181, i is set to 0. Then, if i≦5 (S182: YES), the following steps are repeated. In the following description, Color(i) represents color parameters, and Color·max(i) and Color·min(i) represent color judgment parameters.

At S183, the color parameter Color(i) is set to colorless. Then, at S184, Rf(i) and THvalue·cl(i) are compared.

If Rf(i)<THvalue·cl(i) (S184:YES), |Bf(i)−Gf(i)| and |coefficient·r1(i)×Rf(i)| are compared (S185).

If |Bf(i)−Gf(i)|<|coefficient·r1(i)×Rf(i)| (S185:YES), Color·min(i) is set to Rf(i) (S186).

If Rf(i)≧THvalue·cl(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)≧THvalue·m1(i) (S187:NO) or |Bf(i)−Rf(i)|≧coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)

≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(1)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

It Bf(i)<THvalue·y1(i) (S199:YES), |Gf(i)−Rf(i)| and coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)≧THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202 (FIG. 24), it is judged whether color·min(i) is equal to Rf(i). If color·min(i) is equal to Rf(i) (S202:YES), color(i) is set to cyan (S203). If color·min(i) is not equal to Rf(i), S203 is skipped. Then, color·min(i) and Gf(i) are compared at S204. If color·min(i) is equal to Gf(i) (S204:YES), color(i) is set to magenta (S205). If color·min (i) is not equal to Gf(i), S205 is skipped. Next, it is judged whether color max(i) is equal to Gf(i) at S206. If color·max (i) is equal to Gf(i) (S206:YES), color(i) is set to green (S207). If color·max(i) is not equal to Gf(i) (S206:NO), S207 is skipped. In S208, it is judged whether color·max(i) is equal to Bf(i). If color·max(i) is equal to Bf(i), color(i) is set to blue (S209). If color·max(i) is not equal to Bf(i) (S208:NO), then S209 is skipped.

In S210, it is judged whether color·max(i) is equal to Rf(i). If color·max(i) is equal to Rf(i) (S210:YES), then color(i) is set to red (S211). If color·max(i) is not equal to Rf(i) (S210:NO), S211 is skipped. In S212, color·min(i) is compared with Bf(i). If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, yellow has the highest priority, and in the foregoing steps, the color finally selected in accordance with the conditions is determined as the color of the photometry area. Since the above procedure is repeated for i=0 to i=5, the color of each of the photometry areas A0–A5 is determined.

Next, the colorimetric compensation value calculation procedure is executed, in which colorimetric compensation values CC(i) which are used to compensate for color difference of objects. FIG. 25 shows a flowchart of the "colorimetric compensation value calculation procedure (F11)". In this embodiment, the colorimetric compensation values CC(i) are selected from among predetermined values.

At S221, i is set to an initial value of zero. At S222, it is judged whether i is smaller than or equal to five. If i is 0, 1, 2, 3, 4 or 5, (S222:YES), it is judged whether color(i) is colorless (S223). If it is judged that i>6 at S222 (S222:NO), the procedure is ended. If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), CC(i) is set to C (S226). If color(i) is not cyan (S225:NO), then step S226 is skipped. At S227, it is judged whether color(i) is magenta. If color(i) is magenta (S227:YES), CC(i) is set to M (S228). If color(i) is not magenta (S227:NO), then step S228 is skipped. At S229, it is judged whether color(i) is green. If color(i) is green (S229:YES), CC(i) is set to G(S230). If color(i) is not green (S229:NO), then step S230 is skipped. At S231, it is judged whether color(i) is blue. If color(i) is blue (S231:YES), CC(i) is set to B (S232). If color(i) is not blue (S231:NO), then step S232 is skipped. At S233, it is judged whether color(i) is red. If color(i) is red (S233:YES), CC(i) is set to R (S234). If color(i) is not red (S233:NO), then step S234 is skipped. At S235, it is judged whether color(i) is yellow. If color(i) is yellow (S235:YES), CC(i) is set to Y (S236). If color(i) is not yellow (S235:NO), then step S236 is skipped. Then, at S237, i is incremented by one, and control returns to S222.

If the values shown in FIG. 26 are assigned to the variables Y, M, C, B, G and R determined as above, respectively, the colorimetric compensation values CC(i) are obtained. Alternative to the procedure shown in FIG. 25, the procedure shown in FIG. 27 may be executed.

It should be noted that, in FIG. 27, steps S226, S228, S230, S232, S234 and S236 of the procedure shown in FIG. 25 are replaced with steps S241, S242, S243, S244, S245 and S246, respectively. In the procedure shown in FIG. 25, for determining the compensation values CC(i), fixed values are used. In the procedure shown in FIG. 27, the compensation values CC(i) are determined in accordance with the parameters and setting values, which have been obtained in preceding steps.

Specifically, at step S241, when color(i) is judged to be cyan, the colorimetric compensation value CC(i) is calculated as follows.

$$CC(i) = CCcoefficient \cdot c1(i) \times \{Rf(i) - THvalue \cdot c1(i)\} + CCadjustment \cdot c1(i)$$

When color(i) is judged to be magenta, the colorimetric compensation value CC(i) is calculated as follows at step S242.

$$CC(i) = CCcoefficient \cdot m1(i) \times \{Gf(i) - THvalue \cdot m1(i)\} + CCadjustment \cdot m1(i)$$

When color(i) is judged to be green, the colorimetric compensation value CC(i) is calculated as follows at step S243.

$$CC(i) = CCcoefficient \cdot g1(i) \times \{Gf(i) - THvalue \cdot g1(i)\} + CCadjustment \cdot g1(i)$$

When color(i) is judged to be blue, the colorimetric compensation value CC(i) is calculated as follows at step S244.

$$CC(i) = CCcoefficient \cdot b1(i) \times \{Bf(i) - THvalue \cdot b1(i)\} + CCadjustment \cdot b1(i)$$

When color(i) is judged to be red, the colorimetric compensation value CC(i) is calculated as follows at step S245.

$$CC(i) = CCcoefficient \cdot r1(i) \times \{Rf(i) - THvalue \cdot r1(i)\} + CCadjustment \cdot r1(i)$$

When color(i) is judged to be yellow, the colorimetric compensation value CC(i) is calculated as follows at step S246.

$$CC(i) = CCcoefficient \cdot y1(i) \times \{Bf(i) - THvalue \cdot y1(i)\} + CCadjustment \cdot y1(i)$$

By repeating the procedure shown in FIG. 27 for i=0 through 5, the colorimetric compensation values for each of the photometry areas A0–A5 can be calculated.

FIG. 28 is a flowchart illustrating an "exposure value calculating procedure (F13)", which is called at S17 of the main procedure shown in FIG. 11A. In the "exposure value calculation procedure", the brightness values Bvd(i) obtained in S13 and compensated in S14 are further compensated in accordance with a photographing condition, and then, based on the compensated brightness values Bvd(i), a suitable exposure value Lvd is determined.

For example, by comparing the brightness values Bvd(i) with each other or as a whole, a photographing condition, e.g., a rear light photographing, a magnification and/or scene of photographing, is judged. Then, based on the photographing condition as judged, the exposure value Lvd is calculated by applying a predetermined algorithm with respect to the brightness values Bvd(i). For example, the exposure value Lvd suitable to the photographing condition may be determined by weight-averaging the brightness values Bvd(i), or by selecting one of the brightness values Bvd(i).

At S131, a colorimetric compensation calculation is executed. In the colorimetric compensation calculation, colorimetric compensation values CC(i) for the photometry areas A0–A5 is added to the brightness values Bvd(i) for the photometry areas A0–A5, respectively, to obtain the compensated brightness values Bvd(i). That is:

$$Bvd(i)=Bvd(i)+CC(i)$$

Then, in accordance with the setting of the photometry mode changeover switch 29, a photometry mode flag is set (S132). At S133, an "exposure value calculation procedure" is executed to calculate the exposure value Lvd in accordance with the photometry mode represented by the photometry mode flag.

FIG. 29 shows a flowchart illustrating the "exposure value determining procedure (F14)" which is called at S133 of the flowchart shown in FIG. 28.

At S301, the photometry mode flag and the photometry mode set by the photometry mode changeover switch 29 are checked. Depending on the photometry mode, control diverges to one of S302, S303, S304 and S305. Specifically, when the photometry mode represents the divided photometry, control proceeds to S302 and a divided-photometry exposure value Lvd is calculated. If the photometry mode represents the averaging photometry, control proceeds to S303 and an averaged-photometry exposure value Lvd is calculated. If the photometry mode represents the center-weighted photometry, control proceeds to S304 and a center-weighted photometry exposure value Lvd is calculated. If the photometry mode represents the spot photometry, control proceeds to S305 and a spot photometry exposure value Lvd is calculated.

FIG. 30 shows a flowchart illustrating a "divided-photometry exposure value calculation procedure (F15)", in which the exposure value Lvd is determined based on the compensated brightness values Bvd(i). Firstly, based on the compensated brightness values Bvd(i) for the photometry areas A0–A5 of the sensor 9D, parameters for calculating the exposure value Lvd is obtained (S311). Then, the parameters are compensated based on an upper limit of the brightness (S312), a rear light condition (S313), weighted parameter calculation (S314), a photographing magnification (S315), a photographing scene (S316), a positive compensation for the high brightness photographing scene (S317). Then, based on the compensated parameters, the exposure value Lvd is obtained (S318).

When the averaged-photometry exposure value is obtained at S303 of FIG. 29, the exposure value Lvd is calculated merely by averaging the brightness values Bvd(i) as follows:

$$Lvd=\{Bvd(0)+Bvd(1)+Bvd(2)+Bvd(3)+Bvd(4)+Bvd(5)\}/6$$

When the center-weighted exposure value is obtained at S304 of FIG. 29, the exposure value Lvd is calculated based on the following formula:

$$Lvd=\{Bvd(0)\times 4+Bvd(5)+(Bvd(1)+Bvd(2)+Bvd(3)+Bvd(4))\times 3/4\}/8$$

When the spot-photometry exposure value is obtained at S305 of FIG. 29, the maximum value of the brightness values Bvd(i) is selected. That is:

$$Lvd=max\ \{Bvd(0), Bvd(1), Bvd(2), Bvd(3), Bvd(4), Bvd(5)\}$$

Alternatively, the brightness value Bvd(0) of the central photometry area A0 may be used as the exposure value Lvd.

FIG. 31 shows a flowchart illustrating a "Tvd and Avd calculation procedure (F16)", in which a shutter speed Tvd and an aperture value Avd are calculated based on the determined exposure value Lvd. At first, the shutter speed Tvd is determined using the determined exposure value Lvd according to a predetermined algorithm to perform program automatic exposure (S321). Then, the aperture value Avd is determined according to the determined exposure value Lvd and the determined shutter speed Tvd (S322). That is:

$$Avd=Lvd-Tvd$$

At S323, it is judged whether emission of flash light is necessary or not. For example, when the determined shutter speed Tvd is slower than a certain shutter speed which causes camera movement, it is judged that emission of flash light is necessary. Alternatively, since, if a difference between two brightness values of Bvd (0) (the photometry area A(0)) and Bvd (5) (the photometry area A(5)) is considerably large, and a photographing condition is considered to be a rear light photographing, it may be judged that emission of flash light is necessary.

If it is judged that emission of flash light is necessary (S323:YES), the flash emission flag is set to 1 (S324). If it is not judged that emission of flash light is necessary (S323:NO), the flash emission flag is set to 0 (S325). Then, control returns to the main procedure (FIGS. 11A and 11B).

As described above, the flash emission flag is judged at step S21 in the main procedure (FIG. 11B). If the flash emission flag is not 1 (S21:NO), control proceeds to step S30, where a photographing operation is performed under control of the exposure control device 23 in accordance with the determined shutter speed Tvd and the aperture value Avd. In this case, the photographing operation is performed at correct exposure because the determined shutter speed Tvd and the determined aperture value Avd compensate for the difference of the reflectivity of objects. For example, if the color of an object is yellow, exposure compensation values (i.e., the compensated brightness values Bvd(i)) are determined to overexpose the object. If the color of an object is blue or red, the compensation values are determined to underexpose the object.

If it is judged that the flash emission flag is 1 (S21:YES), control proceeds S22, where the "preliminary flash light emission procedure" is performed. This procedure is shown in FIG. 32. At first, flash light is preliminarily emitted (S331). Then, the controller 20 waits until a predetermined time elapsed to adjust the timing at which each of the photometry sensors 9B, 9G and 9R for RGB color components starts to A/D convert the output voltages of the photometry areas (S332). Then, control returns to the main procedure.

At S23, the photometry sensors 9B, 9G and 9R for RGB color components perform A/D conversion to determine the brightness values Bvd·g(i), Bvd·b(i) and Bvd·r(i), respectively. This procedure (FIG. 33 (F18)) is the same as the step S112.

At S24 (see FIG. 34 (F19)), using the open aperture compensation values Mnd1·g(i), Mnd1·b(i), and Mnd1·r(i) calculated in the "open aperture photometry compensation calculation procedure" in S14, the following calculation is performed. That is:

$$Bvd·g(i)=Bvd·g(i)+Mnd1·g(i).$$

$$Bvd·b(i)=Bvd·b(i)+Mnd1·b(i).$$

$$Bvd·r(i)=Bvd·r(i)+Mnd1·r(i).$$

As a result, each brightness value is free from the effect of the individual differences of photographing lenses 2 coupled to the camera body 1 (S351).

In step S25 (see FIG. 35), the "colorimetry procedure using flash light (F20)" is executed. After the colorimetric parameters are initialized (S31), a "light source compensation procedure for the flash light" (S32A) is executed. That is, compensation values for the effects of the color temperature of the preliminarily emitted flash light are obtained in S32A. At S33, the "light source difference compensation procedure" is executed using the compensation values obtained at S32A. At S34, the "colorimetric parameter calculation procedure" for obtaining colorimetric parameters, which are used to execute the "colorimetric judgment procedure", is executed. At S35, the "colorimetric constants setting procedure" is executed to set constants used for the color measurement. At S36, the "color judgment procedure" for judging a color based on the parameters and constants obtained in the preceding steps is executed. Since, procedures at S31, S33, S34, S35, and S36 are equal to the procedures explained with reference to FIG. 16, respectively, explanation thereof will be omitted.

FIGS. 36 and 37 are flowcharts illustrating the "light source compensation procedures for the flash light (F21-A) and (F21-B), respectively" called at S32A of FIG. 35. As described above, if the photometry sensor 12 is not used, the procedure shown in FIG. 36 is executed, and if the photometry sensor 12 is used, the procedure shown in FIGS. 37 is executed.

The procedure shown in FIG. 36 will be described. At S141, for the color components G, B and R, the brightness data Bvd·light·g, Bvd·light·b, and Bvd·light·r, which are data of the preliminarily emitted flash light, are retrieved from the EEPROM 26 (S141). It should be noted that since the spectral characteristic of the flash light emitted from the flash device of the camera 1000 can be known, the brightness data can be stored in the EEPROM 26. There is no necessity to measure the flash light using photometry sensor 12 to obtain the brightness data of the flash light.

Then, based on the brightness data, the light source compensation value light·gb for the photometry sensor 9B is obtained as follows (S143B).

$$light·gb=Bvd·light·g-Bvd·light·b$$

Similarly, the light source compensation value light·gr for the photometry sensor 9R is obtained as follows (S144B).

$$light·gr=Bvd·light·g-Bvd·light·r$$

Next, "the light source compensation procedure for the flash light" shown in FIG. 37, in which the photometry sensor 12 is used, will be described. At S145, the brightness data obtained by the photometry sensor 12 are abandoned. Then, the procedure which is equal to the procedure of FIG. 36 is executed. Since colorimetry is performed when the flash light is preliminarily emitted, the flash light which functions as a light source has a strong effect on judgment of the color of the object. Therefore, in S36, the brightness data obtained by the photometry sensor 12 are abandoned, and the brightness data of the preliminarily emitted flash light is used. It should be noted that the light source compensation values in a case where the photometry sensor 12 is not used and in a case where the photometry sensor 12 is used are the same.

At S26 of the FIG. 11B, the "calculation procedure for colorimetric compensation value for reflectivity" is executed for each of the photometry areas A0–A5 to calculate a colorimetric compensation value for reflectivity RCC(i) based on the determined color of the object. This procedure is shown in FIG. 38 (F22).

At S421, i is set to an initial value of zero. At S222, it is judged whether i is smaller than or equal to five. If i is 0, 1, 2, 3, 4 or 5, (S422:YES), control proceeds to S423, where it is judged whether color(i) is colorless. If it is judged that i>6 at S422 (S422:NO), the procedure is ended. If color(i) is colorless (S423:YES), RCC(i) is set to zero (S424). If color(i) is not colorless (S423:NO), step S424 is skipped. At S425, it is judged whether color(i) is cyan. If color(i) is cyan (S425:YES), in S426, RCC(i) is determined using the constants set by the colorimetric constants setting procedure in S35 according to the following equation:

$$RCC(i)=CCcoefficient·c1(i)\times\{Rf(i)-THvalue·c1(i)\}+CCadjustment·c1(i)$$

These constants are also used in the following steps.

If color(i) is not cyan (S425:NO), then step S426 is skipped. At S427, it is judged whether color(i) is magenta. If color(i) is magenta (S427:YES), in S428, RCC(i) is calculated as follows.

$$RCC(i)=CCcoefficient·m1(i)\times\{Gf(i)-THvalue·m1(i)\}+CCadjustment·m1(i)$$

If color(i) is not magenta (S427:NO), then step S428 is skipped. At S429, it is judged whether color(i) is green. If color(i) is green (S429:YES), RCC(i) is calculated as follows.

$$RCC(i)=CCcoefficient·g1(i)\times\{Gf(i)-THvalue·g1(i)\}+CCadjustment·g1(i)$$

If color(i) is not green (S429:NO), then step S430 is skipped. At S431, it is judged whether color(i) is blue. If color(i) is blue (S431:YES), RCC(i) is calculated as follows.

$$RCC(i)=CCcoefficient·b1(i)\times\{Gf(i)-THvalue·b1(i)\}+CCadjustment·b1(i)$$

If color(i) is not blue (S431:NO), then step S432 is skipped. At S433, it is judged whether color(i) is red. If color(i) is red (S433:YES), CC(i) is calculated as follows.

$$RCC(i)=CCcoefficient·r1(i)\times\{Rf(i)-THvalue·r1(i)\}+CCadjustment·r1(i)$$

If color(i) is not red (S433:NO), then step S434 is skipped. At S435, it is judged whether color(i) is yellow. If color(i) is yellow (S435:YES), RCC(i) is calculated as follows.

$$RCC(i)=CCcoefficient·y1(i)\times\{Bf(i)-THvalue·y1(i)\}+CCadjustment·y1(i)$$

If color(i) is not yellow (S435:NO), then step S436 is skipped. Then, at S437, i is incremented by one, and control returns to S422. After the colorimetric compensation values have executed for each of the photometry areas A0–A5, the result of step S422 becomes NO, and therefore, control returns to the main procedure. At S27, the "RCC calculation procedure" is executed to obtain the colorimetric compensation value for reflectivity RCC of the whole of the object. This procedure (F23) is shown in FIG. 39. At S451, using the colorimetric compensation value for reflectivity RCC(i), the colorimetric compensation value for reflectivity RCC of the whole of the object is calculated. Foe example, an average, a center-weighted average or a maximum value of the RCC(i) may be calculated in S451. If the average of the RCC(i) is calculated in S451, the following calculation is executed.

$$RCC=(RCC(0)+RCC(1)+RCC(2)+RCC(3)+RCC(4)+RCC(5))/6$$

If the center-weighted average is calculated in S451, the following calculation is executed.

$$RCC=(RCC(0)\times 4+RCC(5)+(RCC(1)+RCC(2)+RCC(3)+RCC(4))\times 3/4)/8$$

Alternatively, the RCC(0) corresponding to the photometry area A(0) at the center of the image may be selected as the center-weighted average.

If the maximum value is calculated in S451, the following calculation is executed.

$$RCC=\max(RCC(0),RCC(1),RCC(2),RCC(3),RCC(4),RCC(5))$$

Alternatively, when the center-weighted average is calculated in S451, coefficients for weighting of the RCC(0), RCC(1), and RCC(2) of the photometry areas A(0), A(1) and A(2), which respectively correspond to the distance measuring points P0, P1, and P2, may be increased.

Alternatively, when the center-weighted average is calculated in S451, one of the colorimetric compensation values for reflectivity RCC(i) may be selected. In this case, the colorimetric compensation value properly reflects reflectivity of a portion of the object corresponding to the distance measuring point.

At S28, the "control level adjusting procedure (F24)" is executed to compensate the flash controlling level SXVD, which is determined by the automatic flash device 28, using the calculated colorimetric compensation value RCC. This procedure is shown in FIG. 40. At S461, the flash controlling level SXVD, which is a parameter used for setting the reference voltage Vtt1 in the automatic flash device 28, is determined by the automatic flash device 28 (S461). It should be noted that when the flash controlling level SXVD is determined, the switch SW2 is set according to the film speed by the automatic flash device 28. Then, the flash controlling level SXVD is compensated using the calculated colorimetric compensation value RCC. That is;

$$SXVD \leftarrow SXVD+RCC$$

As described above, when the release switch SWR is turned to ON, and the photographing operation using flash light is performed under control of the exposure control device 23, the automatic flash device 28 controls emission of the flash light according to the reference voltage Vtt1 determined by the compensated flash controlling level SXVD. Accordingly, emission of the flash light can be controlled based on the result of the colorimetry procedure in which the color of the object is obtained while flash light is preliminarily emitted.

According to the embodiment of the invention, since the flash controlling level SXVD, which defines the reference voltage Vtt1 used for judging the right amount of light exposure, is compensated based on the color of the object, it becomes possible to photographing the object using flash light at correct exposure regardless of the color difference of objects (i.e., the difference of reflectivity of objects). Specifically, if the output of the colorimetric elements indicates that the color of an object is yellow, the flash controlling level SXVD is determined to overexpose the object. Further, if the output of the colorimetric elements indicates that the color of an object is blue or red, the flash controlling level SXVD is determined to underexpose the object. Accordingly, it becomes possible to correct exposure errors due to a difference of reflectivity of objects having different colors when exposure is performed using flash light.

Further, according to the embodiment of the invention, the color of the object is measured while flash light is preliminarily emitted. This means that color rendering properties of light used for colorimetry and flash light which is used for photographing are the same. In this case, the flash controlling level SXVD is compensated properly, and therefore, it becomes possible to photographing the object using flash light at correct exposure.

Furthermore, according to the embodiment of the invention, the light receiving surface of the photometry sensors for RGB color components is divided into six photometry areas, and the colorimetry is performed for each photometry areas. Therefore, both in a case where the object has single color and in a case where the object has a plurality of colors, the proper exposure values can be obtained.

In the embodiment of the invention, the photometry sensor 9D for normal light is provided individually. However, the function of the photometry sensor 9D for normal light can be performed by the photometry sensor 9G because the spectral sensitivity characteristic of the photometry sensor 9G, which has peaks in sensitivity at approximately 540 nm, is similar to that of the photometry sensor 9D for normal light. In this case, in the procedures in S11–S14, Bvad (the output of the photometry sensor 9D) may be replaced with Bvad·g (the output of the photometry sensor 9G). That is, the photometry sensor 9D can be omitted. Therefore, as shown in FIG. 3B, in this case, the number of photometry sensors provided on the rear side of the pentagonal prism 5 can be reduced by one. Accordingly, downsizing and cost reduction of the camera are accomplished.

According to the embodiment of the invention, it becomes possible to photograph the object using flash light at correct exposure regardless of the difference of the color rendering property among various types of flash light.

The present disclosure relates to the subject matter contained in Japanese Patent Application No. 2001-311005, filed on Oct. 9, 2001, which is expressly incorporated herein by reference in its entirety.

What is claimed is:

1. A flash control system for a camera, comprising:
    an automatic flash device that controls an amount of emission of flash light based on a result of a comparison between an amount of light sensed by a photometric sensor and a predetermined appropriate amount of light;
    a control system that preliminarily emits the flash light;
    first photometric sensors for colorimetry capable of performing colorimetry, said first photometric sensors for colorimetry sense different components of light, respectively;
    a first color determining system that determines a color of an object based on outputs of said first photometric sensors for colorimetry, the outputs of said first photometric sensors for colorimetry being obtained when said control system preliminarily emits the flash light;

a first colorimetric compensation value determining system that determines a first colorimetric compensation value based on the color determined by said first color determining system; and a flash control level adjusting system that adjusts the predetermined appropriate amount of light based on the first colorimetric compensation value, wherein said automatic flash device uses the predetermined appropriate amount of light adjusted by said flash control level adjusting system to control the amount of emission of flash light.

2. The flash control system for a camera according to claim 1, wherein each of said first photometric sensors for colorimetry has a plurality of photometry areas, and is capable of performing photometry with respect to each of said plurality of photometry areas, wherein said color determining system determines the color of the object for each of said plurality of photometry areas, wherein said first colorimetric compensation value determining system determines the first colorimetric compensation value at each of the plurality of photometry areas, and determines a second colorimetric compensation value based on the first colorimetric value determined at each of the plurality of photometry areas, and wherein said flash control level adjusting system adjusts the predetermined appropriate amount of light according to the second colorimetric compensation value.

3. The flash control system for a camera according to claim 2, wherein said first colorimetric compensation value determining system determines the second colorimetric compensation value as an average, a center-weighted average, or a maximum value of the first compensation value determined at each of the plurality of photometry areas.

4. The flash control system for a camera according to claim 1, said first color determining system compensates for the outputs of said first photometric sensors for colorimetry depending on data intrinsic to a photographing lens that forms an image of the object, and determines the color of the object based on the compensated outputs of said first photometric sensors for colorimetry.

5. The flash control system for camera according to claim 1, wherein said first color determining system compensates for the outputs of said first photometric sensors for colorimetry according to brightness data with regard to the flash light corresponding to a color rendering property of the flash light, and determines the color of the object based on the compensated outputs of said first photometric sensors for colorimetry.

6. The flash control system for a camera according to claim 1, wherein said automatic flash device includes an integrating circuit that outputs a quenching signal when the amount of light sensed by the photometric sensor reaches the predetermined appropriate amount of light adjusted by said flash control level adjusting system, and a light emission circuit that stops emission of the flash light when the quenching signal is output by said integrating circuit.

7. The flash control system for a camera according to claim 1, wherein the predetermined appropriate amount of light is determined based on at least film speed and the first colorimetric compensation value.

8. The flash control system for a camera according to claim 1, further comprising a photometry device that determines an exposure value based on normal light reflected from the object, and judges whether emission of the flash light is necessary when photographing the object based on the determined exposure value.

9. The flash control system for a camera according to claim 8, said photometry device comprising:

a normal light sensor capable of performing photometry operation with respect to the object at each of the plurality of photometry areas, said normal light sensor having a spectral sensitivity characteristic close to those of human eye;

second photometric sensors for colorimetry capable of performing colorimetry with respect to each of the photometry areas, said second photometric sensors for colorimetry sense different components of light, respectively;

a photometry value determining system that determines an photometry value at each of the plurality of photometry areas in accordance with outputs of said normal light sensor corresponding to the plurality of photometry areas;

a second color determining system that compensates for outputs of said second photometric sensors for colorimetry according to brightness data with regard to the normal light corresponding to a color rendering property of the normal light, and determines a color of the object at each of the plurality of photometry areas based on the compensated outputs of said second photometric sensors for colorimetry;

a second colorimetric compensation value determining system that determines a second colorimetric compensation value at each of the plularity of photometry areas based on the color determined by said second color determining system; and an exposure value determining system that compensates for the photometry value determined by said photometry value determining system for each of the plurality of photometry areas according to the second colorimetric compensation value, and determines the exposure value based on the compensated photometry value.

10. The flash control system for a camera according to claim 9, wherein said first photometric sensors for colorimetry are used as said second photometric sensors for colorimetry.

11. The flash control system for a camera according to claim 9, further comprising a light source sensor capable of performing colorimetry, said light source sensor having photometry areas whose spectral sensitivity characteristics are equal to those of the second photometry sensors, respectively, wherein said second color determining system compensates for the outputs of said second photometric sensors for colorimetry according to an output of said light source sensor in place of the brightness data with regard to the normal light.

12. The flash control system for a camera according to claim 1, said first photometric sensors for colorimetry comprises three sensors which sense a green color component, a red color component, and a blue color component of light, respectively.

13. A flash control system for a camera having a light sensor that obtains a photometry value, comprising:

photometric sensors for colorimetry;

a light source sensor capable of obtaining brightness data corresponding to a color rendering property of normal light;

a first compensator that compensates for the photometry value obtained by said light sensor according to a color of an object when photographing is performed using the normal light, the color of the object being determined based on outputs of said photometric sensors for colorimetry and the brightness data; and a second compensator that compensates for a predetermined appropriate amount of light according to the color of the object when photographing is performed using flash light, the color of the object being determined based on the outputs of said photometric sensors for colorimetry when the flash light is preliminarily emitted and a predetermined compensation value corresponding to a color rendering property of the flash light.

* * * * *